(12) United States Patent
Kulkarni et al.

(10) Patent No.: US 9,416,269 B2
(45) Date of Patent: Aug. 16, 2016

(54) POLYCARBONATE BLEND COMPOSITIONS CONTAINING RECYCLE FOR IMPROVEMENT IN SURFACE AESTHETICS

(71) Applicant: SABIC Global Technologies B.V., Bergen op Zoom (NL)

(72) Inventors: Amit S. Kulkarni, Evansville, IN (US); Vikram K. Daga, Evansville, IN (US); James L. DeRudder, Mount Vernon, IN (US)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 13/739,691

(22) Filed: Jan. 11, 2013

(65) Prior Publication Data

US 2014/0200302 A1 Jul. 17, 2014

(51) Int. Cl.
| | |
|---|---|
| *C08L 69/00* | (2006.01) |
| *C08K 3/34* | (2006.01) |
| *B29C 45/00* | (2006.01) |
| *B29C 47/00* | (2006.01) |
| *C08L 25/12* | (2006.01) |
| *C08L 51/04* | (2006.01) |
| *C08L 55/02* | (2006.01) |

(52) U.S. Cl.
CPC ............ *C08L 69/00* (2013.01); *B29C 45/0001* (2013.01); *B29C 47/0004* (2013.01); *C08L 25/12* (2013.01); *C08L 51/04* (2013.01); *C08L 55/02* (2013.01); *C08L 2205/025* (2013.01)

(58) Field of Classification Search
CPC ..................................................... C08L 69/00
IPC ..................................................... C08L 69/00
See application file for complete search history.

(56) References Cited

U.S. PATENT DOCUMENTS

| 5,424,013 A | 6/1995 | Lieberman |
| 7,947,780 B2 * | 5/2011 | Yamanaka et al. ............ 525/166 |

FOREIGN PATENT DOCUMENTS

| CN | 102464876 A | | 5/2012 |
| DE | 202006020485 | | 8/2008 |
| EP | 1095983 | | 5/2001 |
| EP | 2133390 | | 12/2009 |
| JP | 2002/265798 | | 9/2002 |
| JP | 2004083831 A | * | 3/2004 |
| JP | 2005008816 A | * | 1/2005 |

OTHER PUBLICATIONS

Machine translated English equivalent of JP 2005-008816 (2005, 15 pages).*
Google Translation of key terms in JP 2005-008816 (2014, 1 page).*
Derwent Abstract of JP 2004-083831 (Acc. No. 2004-380018, 2004).*
DeRudder J, et al. (2012) The Effect of Recycle on the Properties of Engineering Thermoplastics, *Plastics Engineering* 68(8): 26-29.

* cited by examiner

*Primary Examiner* — Brieann R Fink
(74) *Attorney, Agent, or Firm* — Baker & Hostetler LLP

(57) ABSTRACT

Disclosed herein are compositions and methods for the manufacture of polycarbonate blend compositions containing recycle for improvement in surface aesthetics. The resulting compositions, can be used in the manufacture of articles while still retaining the advantageous physical properties of polycarbonate blend reference compositions that do not contain recycle material. This abstract is intended as a scanning tool for purposes of searching in the particular art and is not intended to be limiting of the present invention.

78 Claims, 1 Drawing Sheet

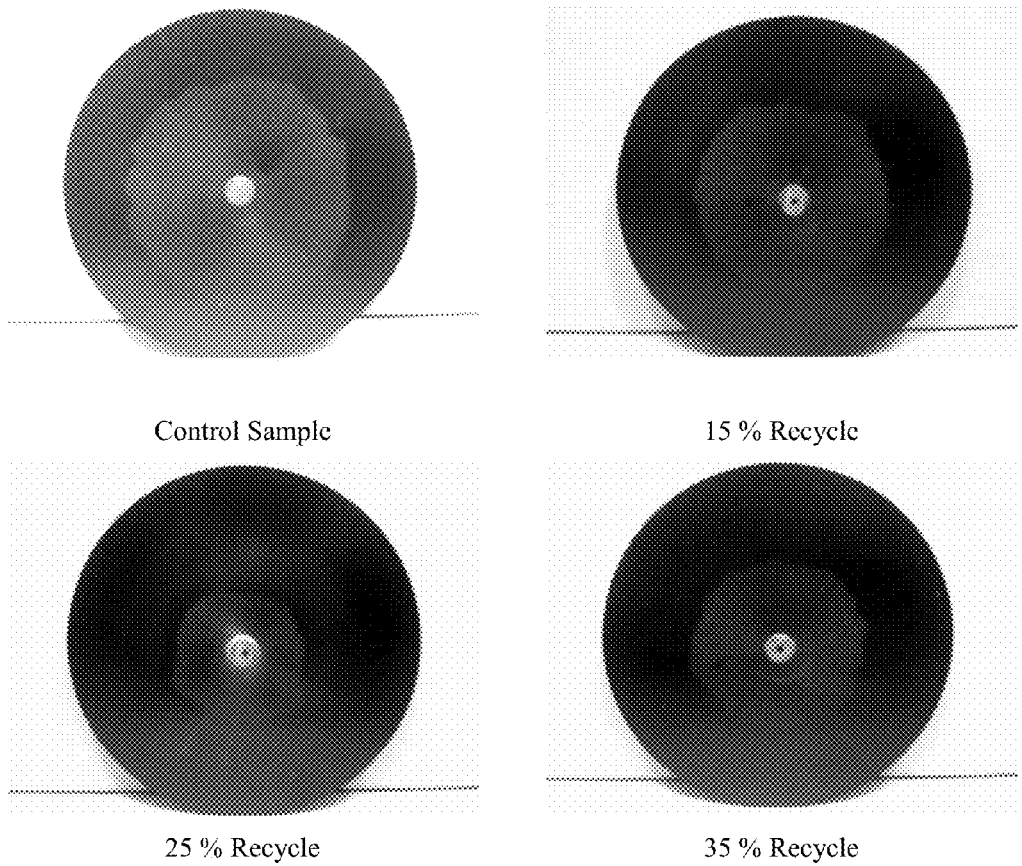

POLYCARBONATE BLEND COMPOSITIONS CONTAINING RECYCLE FOR IMPROVEMENT IN SURFACE AESTHETICS

FIELD OF THE INVENTION

The present invention relates generally to impact modified polycarbonate blend compositions containing recycled components and methods for the manufacture of same.

BACKGROUND OF THE INVENTION

Polycarbonates (PC) are synthetic thermoplastic resins derived from bisphenols and phosgenes, or their derivatives. They are linear polyesters of carbonic acid and can be formed from dihydroxy compounds and carbonate diesters, or by ester interchange. Polymerization may be in aqueous, interfacial, or in nonaqueous solution. Polycarbonates are a useful class of polymers having many desired properties. They are highly regarded for optical clarity and enhanced impact strength, high heat resistance, and relative ductility at room temperature or below.

Acrylonitrile-butadiene-styrene (ABS) polymers are derived from acrylonitrile, butadiene, and styrene monomers. ABS materials generally exhibit excellent impact resistance and toughness. In particular, ABS materials combine the strength and rigidity of the acrylonitrile and styrene polymers with the toughness of the polybutadiene rubber. However, when compared to blends of polycarbonate and ABS, neat acrylonitrile-butadiene-styrene is typically used for applications with less stringent mechanical properties, such as tensile, flexural, heat, and fatigue requirements.

Blends of polycarbonates with ABS (PC/ABS) are amorphous thermoplastic blends that exhibit many desired properties, combining the advantages and/or characteristics of both polycarbonate and ABS. For example, ABS can be incorporated into a polycarbonate blend as an impact modifier, resulting in a PC/ABS blend having high stiffness and impact balance, while maintaining adequate flow for filling out tools with complex geometries. These blends are also known to have a good heat resistance, good processability, weather and ozone resistance, good ductility, electrical resistance, aesthetic characteristics, etc.

These polycarbonate blend compositions are routinely used as substrate parts in various applications, including, but not limited to, in the manufacture of parts for the automotive sector, such as, manufacturing of spoilers, IP-retainers, interior-trim pieces, as well as in furniture applications, where good dimensional stability provides design freedom in complex part assembly.

However, the commonly used polycarbonate blend compositions (PC/ABS blends) can lead to the appearance of the undesired splaying (surface patterns) originating near the gate ends of injection-molded parts. At times the splaying can be so severe that the defects are visible even through a top-coat of paint. As a result, a large amount of molded parts may be rejected. While measures have been put in place to reduce splaying, such strategies have shown only limited success and further add significantly to the processing cost and time.

Incorporation of recycle streams of polycarbonate and/or PC/ABS blends from either post-consumer or post-industrial (PCR or PIR) can reduce manufacturing costs of articles comprising PC/ABS thermoplastic blends. However, the use of currently available recycled content to make high performance engineering thermoplastic products can be problematic since property deterioration with increasing recycle content compared to virgin product is expected, particularly with regard to splaying.

When a recycle stream is added to virgin materials either for cost, productivity or regulatory benefits, the properties generally suffer and the ultimate target so far has been to maintain the properties at an acceptable level in comparison to the virgin materials. For example, a recent paper employed Monte Carlo simulations to study this widely-accepted phenomenon of degradation in properties upon incorporation of recycle. (See, "The Effect of Recycle on the Properties of Engineering Thermoplastics," DeRudder, J., et al., Plastics Engineering, (2012) 68(8): 26-29).

In order to counteract property deterioration with increasing recycle content, it can be necessary to incorporate additional ingredients to match the properties of the virgin material. For example, in order to obtain acceptable properties of pencil hardness, mechanical performance and fireproof performance in compositions comprising recycle PC/ABS and virgin PC/ABS it was found necessary to add polymethylmethacrylate, fire retardant, flexibilizer, processing agent and toner (see Chinese patent application CN102464876A).

Accordingly, to reduce manufacturing costs of PC/ABS thermoplastic blends, there remains a need in the art for polycarbonate blend compositions containing recycled content with reduced splay without changing key properties mentioned above. Additionally, there also remains a need in the art for methods that enable the manufacture of these polycarbonate blend compositions. These and other advantages are provided by various aspects of the present disclosure.

SUMMARY OF THE INVENTION

The present invention relates generally to impact modified polycarbonate blend compositions comprising one or more recycled components. In various aspects, the present invention pertains to the use of recycled components wherein incorporation of the recycled component provides a polycarbonate blend with significantly reduced splay. According to an aspect of the invention, a polycarbonate blend composition is provided that comprises a polycarbonate blend and an impact modifier blend. The polycarbonate blend comprises i) a first polycarbonate component, wherein the first polycarbonate component comprises a virgin polycarbonate; and ii) a second polycarbonate component, wherein the second polycarbonate component comprises a recycled polycarbonate, and wherein the recycled polycarbonate was essentially the same as the virgin polycarbonate prior to recycling. The impact modifier blend comprises i) a first impact modifier component, wherein the first impact modifier component comprises a virgin impact modifier; and ii) a second impact modifier component, wherein the second impact modifier component comprises a recycled impact modifier, and wherein the recycled impact modifier was essentially the same as the virgin impact modifier prior to recycling. Still further according to this aspect, a molded part formed from the composition exhibits less splay than that of a polycarbonate blend reference composition comprising the same amount of a reference polycarbonate component, consisting essentially of the virgin polycarbonate component in the absence of the recycled polycarbonate, the same amount of a reference impact modifier component, consisting essentially of the virgin impact modifier in the absence of the recycled impact modifier.

In a further aspect, the disclosed polycarbonate blend compositions further comprise a flow promoter blend comprising i) a first flow promoter component, wherein the flow promoter component comprises a virgin flow promoter; and ii) a second flow promoter component, wherein the second flow promoter component comprises a recycled flow promoter, and wherein the recycled flow promoter was essentially the same as the virgin flow promoter prior to recycling.

In various aspects, the invention pertains to a polycarbonate blend composition comprising a polycarbonate blend, an impact modifier blend, and a flow promoter blend, wherein the polycarbonate blend comprises i) a first polycarbonate component, wherein the first polycarbonate component comprises a virgin polycarbonate; and ii) a second polycarbonate component, wherein the second polycarbonate component comprises a recycled polycarbonate, and wherein the recycled polycarbonate was essentially the same as the virgin polycarbonate prior to recycling; wherein the impact modifier blend comprises i) a first impact modifier component, wherein the first impact modifier component comprises a virgin impact modifier; and ii) a second impact modifier component, wherein the second impact modifier component comprises a recycled impact modifier, and wherein the recycled impact modifier was essentially the same as the virgin impact modifier prior to recycling; and wherein the flow promoter blend comprises i) a first flow promoter component, wherein the flow promoter component comprises a virgin flow promoter; and ii) a second flow promoter component, wherein the second flow promoter component comprises a recycled flow promoter, and wherein the recycled flow promoter was essentially the same as the virgin flow promoter prior to recycling.

In further aspects, the disclosed compositions can optionally comprise one or more additive components, including for example, mineral filler; flame retardants; stabilizers, lubricants, colorants, antioxidants, and the like.

In further aspects, methods are provided for the manufacture of the polycarbonate blends disclosed and described herein. For example, provided herein is a method for the manufacture of a polycarbonate blend composition, generally comprising the steps of a) providing a polycarbonate component, wherein the first polycarbonate component comprises a virgin polycarbonate stream; b) providing an impact modifier component, wherein the first impact modifier component comprises a virgin impact modifier; c) providing a flow promoter component, wherein the first flow promoter component comprises a virgin flow promoter; and d) providing a recycled polycarbonate blend composition, comprising: i) a second polycarbonate component, wherein the second polycarbonate component comprises a recycled polycarbonate stream, and wherein the recycled polycarbonate was essentially the same as the virgin polycarbonate prior to recycling; and ii) a second impact modifier component, wherein the second impact modifier component is a recycled impact modifier, and wherein the recycled impact modifier was essentially the same as the first impact modifier prior to recycling; and iii) a flow promoter component, wherein the second flow promoter component is a recycled flow promoter, and wherein the recycled flow promoter was essentially the same as the first flow promoter prior to recycling. The method further comprises the step of forming a polycarbonate blend composition by combining the first polycarbonate component, the first impact modifier component, the first flow promoter and the recycled polycarbonate blend composition.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is in no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE FIGURES

The accompanying FIGURE, which are incorporated in and constitute a part of this specification, illustrate several aspects and together with the description serve to explain the principles of the invention.

FIG. 1 shows center-gated disks molded from an exemplary inventive polycarbonate blend composition disclosed and described herein.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

DEFINITIONS

It is also to be understood that the terminology used herein is for the purpose of describing particular aspects only and is not intended to be limiting. As used in the specification and in the claims, the term "comprising" may include the embodiments "consisting of" and "consisting essentially of." Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a virgin polycarbonate" includes mixtures of two or more virgin polycarbonates. Furthermore, for example, reference to a filler includes mixtures of fillers.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally substituted alkyl" means that the alkyl group can or cannot be substituted and that the description includes both substituted and unsubstituted alkyl groups.

As used herein, the term "effective amount" refers to an amount that is sufficient to achieve the desired modification of a physical property of the composition or material. For example, an "effective amount" of a recycled polycarbonate blend refers to an amount that is sufficient to achieve the desired improvement in the property modulated by the formulation component, e.g. splaying, under applicable test conditions and without adversely affecting other specified properties. The specific level in terms of wt % in a composition required as an effective amount will depend upon a variety of factors including the amount and type of recycled polycarbonate blend, amount and type of virgin polycarbonate polymer compositions, amount and type of impact modifier compositions, including virgin and recycled impact modifiers, and end use of the article made using the composition.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent ("wt %") of a component, unless specifically stated to the contrary, is based on the total weight of the formulation or composition in which the component is included. For example if a particular element or component in a composition or article is said to have 8% by weight, it is understood that this percentage is relative to a total compositional percentage of 100% by weight.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

The term "alkyl group" as used herein is a branched or unbranched saturated hydrocarbon group of 1 to 24 carbon atoms, such as methyl, ethyl, n propyl, isopropyl, n butyl, isobutyl, t butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

The term "aralkyl" as used herein is an aryl group having an alkyl, alkynyl, or alkenyl group as defined above attached to the aromatic group. An example of an aralkyl group is a benzyl group.

The term "carbonate group" as used herein is represented by the formula OC(O)OR, where R can be hydrogen, an alkyl, alkenyl, alkynyl, aryl, aralkyl, cycloalkyl, halogenated alkyl, or heterocycloalkyl group described above.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

A very close synonym of the term "residue" is the term "radical," which as used in the specification and concluding claims, refers to a fragment, group, or substructure of a molecule described herein, regardless of how the molecule is prepared. For example, a 2,4-dihydroxyphenyl radical in a particular compound has the structure:

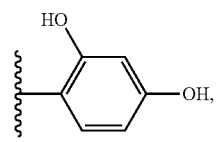 [SMILES: *c1ccc(O)cc1O]

regardless of whether 2,4-dihydroxyphenyl is used to prepare the compound. In some embodiments the radical (for example an alkyl) can be further modified (i.e., substituted alkyl) by having bonded thereto one or more "substituent radicals." The number of atoms in a given radical is not critical to the present invention unless it is indicated to the contrary elsewhere herein.

"Organic radicals," as the term is defined and used herein, contain one or more carbon atoms. An organic radical can have, for example, 1-26 carbon atoms, 1-18 carbon atoms, 1-12 carbon atoms, 1-8 carbon atoms, 1-6 carbon atoms, or 1-4 carbon atoms. In a further aspect, an organic radical can have 2-26 carbon atoms, 2-18 carbon atoms, 2-12 carbon atoms, 2-8 carbon atoms, 2-6 carbon atoms, or 2-4 carbon atoms. Organic radicals often have hydrogen bound to at least some of the carbon atoms of the organic radical. One example, of an organic radical that comprises no inorganic atoms is a 5,6,7,8-tetrahydro-2-naphthyl radical. In some embodiments, an organic radical can contain 1-10 inorganic heteroatoms bound thereto or therein, including halogens, oxygen, sulfur, nitrogen, phosphorus, and the like. Examples of organic radicals include but are not limited to an alkyl, substituted alkyl, cycloalkyl, substituted cycloalkyl, mono-substituted amino, di-substituted amino, acyloxy, cyano, carboxy, carboalkoxy, alkylcarboxamide, substituted alkylcarboxamide, dialkylcarboxamide, substituted dialkylcarboxamide, alkylsulfonyl, alkylsulfinyl, thioalkyl, thiohaloalkyl, alkoxy, substituted alkoxy, haloalkyl, haloalkoxy, aryl, substituted aryl, heteroaryl, heterocyclic, or substituted heterocyclic radicals, wherein the terms are defined elsewhere herein. A few non-limiting examples of organic radicals that include heteroatoms include alkoxy radicals, trifluoromethoxy radicals, acetoxy radicals, dimethylamino radicals and the like.

As used herein, the terms "number average molecular weight" or "$M_n$," can be used interchangeably, and refer to the statistical average molecular weight of all the polymer chains in the sample and is defined by the formula:

$$M_n = \frac{\sum N_i M_i}{\sum N_i},$$

where $M_i$ is the molecular weight of a chain and $N_i$ is the number of chains of that molecular weight. $M_n$ can be determined for polymers, e.g. polycarbonate polymers, by methods well known to a person having ordinary skill in the art using molecular weight standards, e.g. polycarbonate standards or polystyrene standards, preferably certified or traceable molecular weight standards.

As used herein, the terms "weight average molecular weight" or "Mw" can be used interchangeably, and are defined by the formula:

$$M_w = \frac{\sum N_i M_i^2}{\sum N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight average. Thus, the greater the molecular weight of a given chain, the more the chain contributes to the $M_w$. $M_w$ can be determined for polymers, e.g. polycarbonate polymers, by methods well known to a person having ordinary skill in the art using molecular weight standards, e.g. polycarbonate standards or polystyrene standards, preferably certified or traceable molecular weight standards.

As used herein, the terms "polydispersity index" or "PDI" can be used interchangeably, and are defined by the formula:

$$PDI = \frac{M_w}{M_n}.$$

The PDI has a value equal to or greater than 1, but as the polymer chains approach uniform chain length, the PDI approaches unity.

The terms "BisA" or "bisphenol A," which can be used interchangeably, as used herein refers to a compound having a structure represented by the formula:

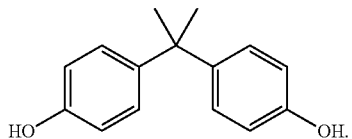

BisA can also be referred to by the name 4,4'-(propane-2,2-diyl)diphenol; p,p'-isopropylidenebisphenol; or 2,2-bis(4-hydroxyphenyl)propane. BisA has the CAS #80-05-7.

As used herein, the term "polycarbonate" refers to a polymer comprising the same or different carbonate units, or a copolymer that comprises the same or different carbonate units, as well as one or more units other than carbonate (i.e. copolycarbonate). The term polycarbonate can be further defined as compositions have repeating structural units of the formula (I):

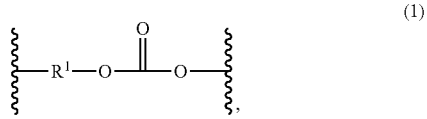

wherein at least 60 percent of the total number of R' groups are aromatic organic radicals and the balance thereof are aliphatic, alicyclic, or aromatic radicals. Polycarbonate (PC) will be taken to mean virgin polycarbonate as well as polycarbonate recyclate.

The term "miscible" refers to blends that are a mixture on a molecular level wherein intimate polymer-polymer interaction is achieved.

The terms "polycarbonate" or "polycarbonates" as used herein includes copolycarbonates, homopolycarbonates and (co)polyester carbonates.

The terms "residues" and "structural units", used in reference to the constituents of the polymers, are synonymous throughout the specification.

As used herein, the term "ABS" or "acrylonitrile-butadiene-styrene copolymer" refers to an acrylonitrile-butadiene-styrene polymer which can be an acrylonitrile-butadiene-styrene terpolymer or a blend of styrene-butadiene rubber and styrene-acrylonitrile copolymer.

As used herein, the term "flow promoter" refers to an additive to the disclosed impact modified polycarbonate blend compositions wherein the flow promoter which enables polymers to flow easier in difficult parts, e.g. addition of the flow promoter has increases the MVR of the disclosed impact modified polycarbonate blend composition. As used herein, a flow promoter can be one or more copolymers comprising an acrylonitrile or (meth)methacrylate monomer, e.g. a styrene acrylonitrile copolymer or a poly(methyl methacrylate).

As used herein, the term "impact modifier" refers to a component of the disclosed impact modified polycarbonate blend compositions wherein the impact modifier is a polymeric material effective in improving the impact properties of the disclosed impact modified polycarbonate blend compositions, e.g. the notched Izod impact strength of the composition. As used herein, an impact modifier can be a one or more polymers such as acrylonitrile butadiene styrene copolymer (ABS), methacrylate butadiene styrene copolymer (MBS), and/or bulk polymerized ABS (BABS).

"Virgin thermoplastic" and "virgin polymer" are terms that can be used interchangeably, as used herein, excludes polymers and polymer blends that have been used in end-use parts, articles, or components.

The term "post-consumer material," as used herein, refers to material, e.g. a polymer or polymers, that has reached the intended end user or consumer, and which is no longer being used for the intended purpose.

The term "post-consumer recycled material," as used herein, refers to material, e.g. a polymer or polymers that has reached the intended end user or consumer, is no longer being used for the intended purpose, and which has been collected or reclaimed after utilization by the end-user or consumer. Thus, for example, it is understood that the terms refers to material that would have otherwise been disposed of as waste, but has instead been collected and recovered (reclaimed) as a material input, in lieu of new virgin material, for a recycling or manufacturing process. The term is inclusive of such collected or reclaimed materials which have been further treated or processed to facilitate re-use of the material. Thus, for example, the term is inclusive of material that has been reprocessed from collected or reclaimed material by means of a manufacturing process and made into a product or into a component for incorporation into a product.

Thus, it is understood, that the particular material can be specified with similar meaning. For example, it is understood that "post-consumer recycled polycarbonate" refers to polycarbonate that has reached the intended end user or consumer, is no longer being used for the intended purpose, and which has been collected or reclaimed after utilization by the end-user or consumer, e.g. collected apart or separated from the normal consumer waste streams.

The term is inclusive of such collected materials which have been further treated or processed to facilitate re-use of the material. Such recycled materials, e.g. polycarbonate, can be further processed to ground material, flakes, or in the form of pellets. In the latter case, the crude recycled materials are separated and purified, and then melted and pelletized using an extruder. This usually facilitates handling and free flow, and metering for further steps in processing. Typically, for convenience, the edge length of such pelletized or ground materials should not be more than 10 mm, and frequently less than 8 mm.

The term "post-consumer polymer," as used herein, refers to a polymer or polymers utilized in the manufacture of an article that has reached the intended end user or consumer, and which is no longer being used for the intended purpose. In this context, the particular polymer can be specified, e.g. it is understood that "post-consumer polycarbonate" refers to a polycarbonate polymer or polymers utilized in the manufacture of an article that has reached the intended end user or consumer, and which is no longer being used for the intended purpose. Likewise, for example, "post-consumer ABS" or "post-consumer acrylonitrile-butadiene-styrene copolymer," terms that can be used interchangeably, is understood to refer to an ABS polymer or polymers used in the manufacture of an article that has reached the intended end user or consumer, and which is no longer being used for the intended purpose.

The term "post-industrial material," as used herein, refers to material, e.g. a polymer or polymers, that has never reached the end user and that is production waste arising during polymerization reactions, e.g. polycondensation, during further processing, or during manufacturing an article and includes materials such as, but not limited to, sprues from injection molding, start-up material from injection molding or extrusion, extrusion scrap, molding scrap, edge trims from extruded sheets or films, and the like, including materials diverted from the waste stream during a manufacturing process for an article.

The term "post-industrial recycled material," as used herein, material, e.g. a polymer or polymers, that has never reached the end user and that is production waste arising during polymerization reactions, e.g. polycondensation, during further processing, or during manufacturing an article and includes materials such as, but not limited to, sprues from injection molding, start-up material from injection molding or extrusion, edge trims from extruded sheets or films, and the like, including materials diverted from the waste stream during a manufacturing process for an article, and wherein the materials are collected or reclaimed for re-use and/or reprocessing. Thus, for example, it is understood that the terms refers to material that would have otherwise been disposed of as waste or used for energy recovery, but has instead been collected and recovered (reclaimed) as a material input, in lieu of new virgin material, for a recycling or manufacturing process. The term is inclusive of such collected or reclaimed materials which have been further treated or processed to facilitate re-use of the material. Thus, for example, the term is inclusive of material that has been reprocessed from collected or reclaimed material by means of a manufacturing process and made into a product or into a component for incorporation into a product. Post-industrial recycled material is inclusive of regrind materials, rework materials, and scrap materials.

As used herein, the term "regrind materials" refers to material that has been used at least once in a manufacturing process and has gone through a size reduction process to be made into smaller pieces for reuse into the same product from which it was generated.

As used herein, the term "rework materials" refers to materials or products that did not meet specifications upon exiting a process and require one or more tasks to be completed to correct the errors before entering the next processing step or finished goods inventory.

As used herein, the term "scrap" refers to rejected or discarded material generated by a manufacturing process that is useful only after it is reprocessed.

Thus, it is understood, that a "post-industrial recycled material" can be specified with similar meaning. For example, it is understood that "post-industrial recycled polycarbonate" refers to a polycarbonate polymer or polymers that has never reached the end user and that is production waste arising during polymerization reactions, e.g. polycondensation, during further processing, or during manufacturing an article and includes materials such as, but not limited to, sprues from injection molding, start-up material from injection molding or extrusion, extrusion scrap, molding scrap, edge trims from extruded sheets or films, and the like, including materials diverted from the waste stream during a manufacturing process for an article.

As already mentioned, the term "post-industrial recycled material" is also inclusive of such collected materials which have been further treated or processed to facilitate re-use of the material. Such recycled materials, e.g. polycarbonate, can be further processed to ground material, flakes, or in the form of pellets. In the latter case, the crude recycled materials are separated and purified, and then melted and pelletized using an extruder. This usually facilitates handling and free flow, and metering for further steps in processing. Typically, for convenience, the edge length of such pelletized or ground materials should not be more than 10 mm, and frequently less than 8 mm.

The term "post-industrial polymer," as used herein, refers to a polymer or polymers that has never reached the end user and that is production waste arising during polymerization reactions, e.g. polycondensation, during further processing, or during manufacturing an article and includes materials such as, but not limited to, sprues from injection molding, start-up material from injection molding or extrusion, extrusion scrap, molding scrap, edge trims from extruded sheets or films, and the like, including materials diverted from the waste stream during a manufacturing process for an article.

In this context, the particular polymer can be further specified with similar meaning, e.g. it is understood that "post-industrial polycarbonate" refers to a polycarbonate polymer or polymers that has never reached the end user and that is production waste arising during polymerization reactions, e.g. polycondensation, during further processing, or during manufacturing an article and includes materials such as, but not limited to, sprues from injection molding, start-up material from injection molding or extrusion, extrusion scrap, molding scrap, edge trims from extruded sheets or films, and the like, including materials diverted from the waste stream during a manufacturing process for an article. Likewise, for example, "post-industrial ABS" or "post-industrial acrylonitrile-butadiene-styrene copolymer," terms that can be used interchangeably, is understood to refer to an ABS polymer or polymers that has never reached the end user and that is production waste arising during polymerization reactions, e.g. polycondensation, during further processing, or during manufacturing an article and includes materials such as, but not limited to, sprues from injection molding, start-up material from injection molding or extrusion, extrusion scrap, molding scrap, edge trims from extruded sheets or films, and the like, including materials diverted from the waste stream during a manufacturing process for an article.

Unless otherwise noted, each of the component materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Polycarbonate Blend Compositions

As briefly described above, an aspect of the present invention provides polycarbonate blend compositions comprising one or more recycled components. More specifically, provided are impact modified polycarbonate blend compositions comprising a polycarbonate component comprising both virgin and recycled polycarbonate components and an impact modifier component comprising both virgin and recycled impact modifier components. The provided compositions can further optionally comprise a flow promoter component. The flow promoter component can similarly comprise both a virgin and recycled flow promoter component. Alternatively, the flow promoter component can be provided as only a virgin flow promoter. Still further alternatively, the flow promoter component can be provided as only a recycled flow promoter component. Still further, the provided impact modified polycarbonate blend compositions can also optionally comprise one or more additive components, including for example, fillers, stabilizers, flame retardants, colorants, mold release agents, lubricants, and the like.

Surprisingly, according to some aspects of the invention, the impact modified polycarbonate blend compositions of the present invention comprising recycled content exhibit reduced levels of splay when compared to conventional or reference compositions in the absence of the recycled content. As one of ordinary skill in the art will appreciate, the term "splay" as used herein refers to a splash-like appearance or a spray pattern on a surface of a molded part, which typically occurs near the gate end of an injection molded part. For example, FIG. 1 illustrates undesired splay or surface patterns that can occur from commonly used convention impact modified polycarbonate blends in the absence of any recycled content.

According to aspects of the invention, a molded part formed from the inventive impact modified polycarbonate blend compositions exhibits at least about 25% less splay than that of a corresponding polycarbonate reference composition. In a further aspect, a molded part formed from the inventive impact modified polycarbonate blend compositions exhibits at least 40% less splay than that of a corresponding polycarbonate reference composition. In still a further aspect, a molded part formed from an inventive impact modified polycarbonate blend composition exhibits at least 60% less splay than that of a corresponding polycarbonate reference composition.

According to further aspects, the inclusion of recycled content in the disclosed impact modified polycarbonate blend compositions does not substantially reduce or negatively impact other desirable properties including for example melt flow properties. For example, despite the inclusion of significant recycled content, the impact modified polycarbonate blend compositions disclosed and described herein can exhibit a melt flow rate (MVR) as measured by the ASTM D1238 and ISO 1133 protocols at 260° C. under 5 kg load and a 360 second dwell time, that is no more than 20% different than that of a polycarbonate blend reference composition. In still further aspects, the impact modified polycarbonate blend compositions disclosed and described herein can exhibit a melt flow rate (MVR) as measured by the ASTM D1238 and ISO 1133 protocols at 260° C. under 5 kg load and a 360 second dwell time, that is no more than 15% different than that of a polycarbonate blend reference composition. In still further aspects, the impact modified polycarbonate blend compositions disclosed and described herein can exhibit a melt flow rate (MVR) as measured by the ASTM D1238 and ISO 1133 protocols at 260° C. under 5 kg load and a 360 second dwell time, that is no more than 10% different than that of the polycarbonate blend reference composition.

In further aspects, the inclusion of recycled content in the disclosed impact modified polycarbonate blend compositions does not substantially reduce or negatively impact other desirable mechanical properties, including for example, impact strength properties. For example, despite the inclusion of recycled content, the impact modified polycarbonate blend compositions disclosed and described herein can exhibit a notched Izod impact strength that is no more than 30% less than that of a polycarbonate blend reference composition and maintains good ductility. In another aspect, the impact modified polycarbonate blend compositions disclosed and described herein can exhibit a notched Izod impact strength that is no more than 20% less than that of a polycarbonate blend reference composition. In still further aspects, the impact modified polycarbonate blend compositions disclosed and described herein can exhibit a notched Izod impact strength that is no more than 15% less than that of a polycarbonate blend reference composition. As referred to herein, the notched Izod impact ("NOO") test is carried out per ISO180/A at 23° C. and 0° C. using a specimen of 4 mm thickness or using the ASTM D256 standard at 23° C. using a specimen of 3.2 mm.

In various aspects, the invention pertains to polycarbonate blend compositions, comprising: a) a polycarbonate blend comprising: i) a first polycarbonate component, wherein the first polycarbonate component comprises a virgin polycarbonate; and ii) a second polycarbonate component, wherein the second polycarbonate component comprises a recycled polycarbonate, and wherein the recycled polycarbonate is essentially the same as the virgin polycarbonate prior to recycling; b) an impact modifier blend comprising: i) a first impact modifier component, wherein the first impact modifier component comprises a virgin impact modifier; and ii) a second impact modifier component, wherein the second impact modifier component comprises a recycled impact modifier, and wherein the recycled impact modifier is essentially the same as the virgin impact modifier prior to recycling; wherein a molded part formed from the composition, exhibits less splay than that of a polycarbonate blend reference composition, comprising the same amount of a reference polycarbonate component, consisting essentially of the virgin polycarbonate component in the absence of the recycled polycarbonate, the same amount of a reference impact modifier component, consisting essentially of the virgin impact modifier in the absence of the recycled impact modifier.

In a further aspect, the polycarbonate blend composition further comprises: c) a flow promoter blend comprising: i) a first flow promoter component, wherein the flow promoter component comprises a virgin flow promoter; and ii) a second flow promoter component, wherein the second flow promoter component comprises a recycled flow promoter, and wherein the recycled flow promoter is essentially the same as the virgin flow promoter prior to recycling.

In a further aspect, the polycarbonate blend composition further comprises a mineral filler component. In a still further aspect, the mineral filler component comprises talc. In a yet further aspect, the mineral filler component is present in an amount from about 5 wt % to about 25 wt %. In an even further aspect, the mineral filler component is present in an amount in the range of from about 8 wt % to about 30 wt %. In a still further aspect, the mineral filler component is present in an amount in the range of from about 12 wt % to about 17 wt %. In a yet further aspect, the mineral filler component is present in the amount of about 15 wt % of the polymer blend composition.

In a further aspect, the first flow promoter component comprises a flow promoter selected from a styrene acrylonitrile (SAN) flow promoter and a poly(methyl methacrylate) (PMMA) flow promoter, or combinations thereof. In a still further aspect, the first flow promoter component comprises a styrene acrylonitrile (SAN) flow promoter. In a yet further aspect, the first flow promoter component comprises a poly (methyl methacrylate) (PMMA) flow promoter.

In a further aspect, the flow promoter blend is present in an amount from about 2 wt % to about 18 wt %. In a still further aspect, the flow promoter blend is present in an amount from about 5 wt % to about 15 wt %. In a yet further aspect, the flow promoter blend is present in an amount from about 7 wt % to about 12 wt %.

In a further aspect, the flow promoter blend comprises: a) the first flow promoter component in an amount from about 60 wt % to about 85 wt %; and b) the second flow promoter component in an amount from about 15 wt % to about 40 wt %; wherein the weigh percentages are based on the total weight of the flow promoter blend.

In a further aspect, the first polycarbonate component comprises a homopolymer polycarbonate of bisphenol A. In a still further aspect, the first polycarbonate component comprises a blend of at least two virgin polycarbonates.

In a further aspect, the polycarbonate blend comprising the first and second polycarbonate components is present in an amount from about 20 wt % to about 85 wt % of the polycarbonate blend composition. In an even further aspect, the polycarbonate blend comprising the first and second polycarbonate components is present in an amount from about 60 wt % to about 75 wt % of the polycarbonate blend composition. In a still further aspect, the polycarbonate blend comprising the first and second polycarbonate components is present in an amount from about 65 wt % to about 72 wt % of the polycarbonate blend composition. In a yet further aspect, the polycarbonate blend comprises: a) the first polycarbonate component in an amount from about 60 wt % to about 85 wt %; and b) the second polycarbonate component in an amount from about 15 wt % to about 40 wt %; wherein the weigh percentages are based on the total weight of the polycarbonate blend.

In various aspects, wherein the first polycarbonate component has a weight average molecular weight ($M_w$) from about 15,000 g/mol to about 100,000 g/mol on an absolute PC molecular weight scale. In a still further aspect, the first polycarbonate component has a $M_w$ from about 15,000 g/mol to about 50,000 g/mol on an absolute PC molecular weight scale. In a yet further aspect, the first polycarbonate component has a $M_w$ from about 15,000 g/mol to about 40,000 g/mol on an absolute PC molecular weight scale. In an even further aspect, the first polycarbonate component has a $M_w$ from about 15,000 g/mol to about 35,000 g/mol on an absolute PC molecular weight scale. In a still further aspect, the first polycarbonate component has a $M_w$ from about 15,000 g/mol to about 30,000 g/mol on an absolute PC molecular weight scale. It is understood, and readily appreciated by one skilled in the art, that the weigh average molecular weight ($M_w$) as referred to herein for the disclosed invention is determined by gel permeation chromatography using DIN certified or otherwise traceable polycarbonate molecular weight standards. Thus, for clarity, it is understood that the $M_w$ is based on an absolute PC molecular weight scale.

In a further aspect, wherein the first polycarbonate component has a weight average molecular weight ($M_w$) from about 20,000 g/mol to about 100,000 g/mol on an absolute PC molecular weight scale. In a still further aspect, the first polycarbonate component has a $M_w$ from about 20,000 g/mol to about 50,000 g/mol on an absolute PC molecular weight scale. In a still further aspect, the first polycarbonate component has a $M_w$ from about 20,000 g/mol to about 40,000 g/mol on an absolute PC molecular weight scale. In an even further aspect, the first polycarbonate component has a $M_w$ from about 20,000 g/mol to about 35,000 g/mol on an absolute PC molecular weight scale. In a still further aspect, the first polycarbonate component has a $M_w$ from about 20,000 g/mol to about 30,000 g/mol on an absolute PC molecular weight scale.

In a further aspect, wherein the first polycarbonate component has a weight average molecular weight ($M_w$) from about 22,000 g/mol to about 100,000 g/mol on an absolute PC molecular weight scale. In a still further aspect, the first polycarbonate component has a $M_w$ from about 22,000 g/mol to about 50,000 g/mol on an absolute PC molecular weight scale. In a still further aspect, the first polycarbonate component has a $M_w$ from about 22,000 g/mol to about 40,000 g/mol on an absolute PC molecular weight scale. In an even further aspect, the first polycarbonate component has a $M_w$ from about 22,000 g/mol to about 35,000 g/mol on an absolute PC molecular weight scale. In a still further aspect, the first polycarbonate component has a $M_w$ from about 22,000 g/mol to about 30,000 g/mol on an absolute PC molecular weight scale.

In a further aspect, wherein the first polycarbonate component has a weight average molecular weight ($M_w$) from about 25,000 g/mol to about 100,000 g/mol on an absolute PC molecular weight scale. In a still further aspect, the first polycarbonate component has a $M_w$ from about 25,000 g/mol to about 50,000 g/mol on an absolute PC molecular weight scale. In a still further aspect, the first polycarbonate component has a $M_w$ from about 25,000 g/mol to about 40,000 g/mol on an absolute PC molecular weight scale. In an even further aspect, the first polycarbonate component has a $M_w$ from about 25,000 g/mol to about 35,000 g/mol on an absolute PC molecular weight scale. In a still further aspect, the first polycarbonate component has a $M_w$ from about 25,000 g/mol to about 30,000 g/mol on an absolute PC molecular weight scale.

In a further aspect, the first impact modifier component comprises one more of an acrylonitrile butadiene styrene ("ABS"), a methacrylate butadiene styrene ("MBS"), and a bulk polymerized ABS ("BABS"). In a still further aspect, the first impact modifier component comprises an acrylonitrile butadiene styrene ("ABS") impact modifier. In a yet further aspect, the first impact modifier component comprises a methacrylate butadiene styrene ("MBS") impact modifier. In an even further aspect, the first impact modifier component comprises a bulk polymerized ABS ("BABS").

In a further aspect, the impact modifier blend is present in an amount from about 2 wt % to about 18 wt %. In a yet further aspect, the impact modifier blend is present in an amount from about 3 wt % to about 10 wt %. In an even further aspect, the impact modifier blend is present in an amount from about 4 wt % to about 8 wt %. In a still further aspect, the impact modifier blend comprises: a) the first impact modifier component in an amount from about 60 wt % to about 85 wt %; and b) the second impact modifier component in an amount from about 15 wt % to about 40 wt %; wherein the weight percentages are based on the total weight of the impact modifier blend.

In a further aspect, the second polycarbonate component comprises a recycled polycarbonate derived from post-industrial recycled (PIR) polycarbonate. In a still further aspect, the second polycarbonate component comprises a recycled polycarbonate derived from post-consumer recycled (PCR) polycarbonate.

In a further aspect, the recycled polycarbonate comprises: a) less than about 100 pm arsenic, and wherein the arsenic can be present as elemental arsenic, one or more arsenic compounds, or a combination thereof; b) less than about 10 ppm mercury, and wherein the mercury can be present as elemental mercury, one or more mercury compounds, or a combination thereof; c) less than about 10 ppm lead, and wherein the lead can be present as elemental lead, one or more mercury compounds, or a combination thereof; d) less than about 10 ppm cadmium, and wherein the cadmium can be present as elemental cadmium, one or more cadmium compounds, or a combination thereof; e) less than about 10 ppm of a lanthanide, and wherein the lanthanide can be present in the elemental form, one or more lanthanide compounds, or a combination thereof; or f) less than about 10 ppm of an actinide, and wherein the actinide can be present in the elemental form, one or more actinide compounds, or a combination thereof. In a still further aspect, the recycled polycarbonate comprises less than about 100 pm arsenic, and wherein the arsenic can be present as elemental arsenic, one or more arsenic compounds, or a combination thereof. In a yet further aspect, the recycled polycarbonate comprises less than about 10 ppm mercury, and wherein the mercury can be present as elemental mercury, one or more mercury compounds, or a combination thereof. In an even further aspect, the recycled polycarbonate comprises less than about 10 ppm lead, and wherein the lead can be present as elemental lead, one or more mercury compounds, or a combination thereof. In a still further aspect, the recycled polycarbonate comprises less than about 10 ppm cadmium, and wherein the cadmium can be present as elemental cadmium, one or more cadmium compounds, or a combination thereof. In a yet further aspect, the recycled polycarbonate comprises less than about 10 ppm of a lanthanide, and wherein the lanthanide can be present in the elemental form, one or more lanthanide compounds, or a combination thereof. In an even further aspect, the recycled polycarbonate comprises less than about 10 ppm of an actinide, and wherein the actinide can be present in the elemental form, one or more actinide compounds, or a combination thereof.

In a further aspect, the recycled polycarbonate comprises less than about 1000 ppm of a bromine containing compound; and wherein the recycled polycarbonate comprises less than about 1000 ppm of a chlorine containing compound. In various further aspects, the recycled polycarbonate comprises less than about 1000 ppm of a bromine containing compound; wherein the recycled polycarbonate comprises less than about 1000 ppm of a chlorine containing compound; and wherein the recycled polycarbonate comprises: a) less than about 100 pm arsenic, and wherein the arsenic can be present as elemental arsenic, one or more arsenic compounds, or a combination thereof; b) less than about 10 ppm mercury, and wherein the mercury can be present as elemental mercury, one or more mercury compounds, or a combination thereof; c) less than about 10 ppm lead, and wherein the lead can be present as elemental lead, one or more mercury compounds, or a combination thereof; d) less than about 10 ppm cadmium, and wherein the cadmium can be present as elemental cadmium, one or more cadmium compounds, or a combination thereof; e) less than about 10 ppm of a lanthanide, and wherein the lanthanide can be present in the elemental form, one or more lanthanide compounds, or a combination thereof or f) less than about 10 ppm of an actinide, and wherein the actinide can be present in the elemental form, one or more actinide compounds, or a combination thereof.

In various aspects, the invention pertains to polycarbonate blend compositions, comprising: a) a polycarbonate blend comprising: i) a first polycarbonate component, wherein the first polycarbonate component comprises a virgin polycarbonate; and ii) a second polycarbonate component, wherein the second polycarbonate component comprises a recycled polycarbonate, and wherein the recycled polycarbonate is essentially the same as the virgin polycarbonate prior to recycling; b) an impact modifier blend comprising: i) a first impact modifier component, wherein the first impact modifier component comprises a virgin impact modifier; and ii) a second impact modifier component, wherein the second impact modifier component comprises a recycled impact modifier, and wherein the recycled impact modifier is essentially the same as the virgin impact modifier prior to recycling; and c) a flow promoter blend comprising: i) a first flow promoter component, wherein the flow promoter component comprises a virgin flow promoter; and ii) a second flow promoter component, wherein the second flow promoter component comprises a recycled flow promoter, and wherein the recycled flow promoter is essentially the same as the virgin flow promoter prior to recycling; wherein a molded part formed from the composition, exhibits less splay than that of a polycarbonate blend reference composition, comprising the same amount of a reference polycarbonate component, consisting essentially of the virgin polycarbonate component in the absence of the recycled polycarbonate, the same amount of a reference impact modifier component, consisting essentially of the virgin impact modifier in the absence of the recycled impact modifier; and the same amount of a reference flow promoter component, consisting essentially of the virgin flow promoter in the absence of the recycled flow promoter.

In various aspects, the invention pertains to polycarbonate blend compositions, comprising: a) a polycarbonate blend comprising: i) a first polycarbonate component, wherein the first polycarbonate component comprises a virgin polycarbonate; and ii) a second polycarbonate component, wherein the second polycarbonate component comprises a recycled polycarbonate, and wherein the recycled polycarbonate is essentially the same as the virgin polycarbonate prior to recycling; b) an impact modifier blend comprising: i) a first impact modifier component, wherein the first impact modifier component comprises a virgin impact modifier; and ii) a second impact modifier component, wherein the second impact modifier component comprises a recycled impact modifier, and wherein the recycled impact modifier is essentially the same as the virgin impact modifier prior to recycling; c) a flow promoter blend comprising: i) a first flow promoter component, wherein the flow promoter component comprises a virgin flow promoter; and ii) a second flow promoter component, wherein the second flow promoter component comprises a recycled flow promoter, and wherein the recycled flow promoter is essentially the same as the virgin flow promoter prior to recycling; and d) a mineral filler component; wherein a molded part formed from the composition, exhibits less splay than that of a polycarbonate blend reference composition, comprising the same amount of a reference polycarbonate component, consisting essentially of the virgin polycarbonate component in the absence of the recycled polycarbonate, the same amount of a reference impact modifier component, consisting essentially of the virgin impact modifier in the absence of the recycled impact modifier; the same amount of a reference flow promoter component, consisting essentially of the virgin flow promoter in the absence of the recycled flow promoter; and the same amount of the same mineral filler component.

In a further aspect, the invention pertains to polycarbonate blend compositions, comprising: a) a polycarbonate blend comprising: i) a first polycarbonate component, wherein the first polycarbonate component comprises a virgin polycarbonate; and ii) a second polycarbonate component, wherein the second polycarbonate component comprises a recycled polycarbonate, and wherein the recycled polycarbonate is essentially the same as the virgin polycarbonate prior to recycling; b) an impact modifier blend comprising: i) a first impact modifier component, wherein the first impact modifier component comprises a virgin impact modifier; and ii) a second impact modifier component, wherein the second impact modifier component comprises a recycled impact modifier, and wherein the recycled impact modifier is essentially the same as the virgin impact modifier prior to recycling; c) a flow promoter blend comprising: i) a first flow promoter component, wherein the flow promoter component comprises a virgin flow promoter; and ii) a second flow promoter component, wherein the second flow promoter component comprises a recycled flow promoter, and wherein the recycled flow promoter is essentially the same as the virgin flow promoter prior to recycling; and d) a mineral filler component; wherein the composition exhibits a melt volume rate (MVR) no more than about 20% different than that of the polycarbonate blend reference composition, as measured using ASTM D 1238 at 260° C. under 5 kg load and a 360 second dwell time; wherein the composition exhibits a notched Izod impact strength no more than about 20% less than that of the polycarbonate blend reference composition, as measured at 23° C. according to ISO 180; and wherein a molded part formed from the composition, exhibits at least about 25% less splay than that of a polycarbonate blend reference composition, comprising the same amount of a reference polycarbonate component, consisting essentially of the virgin polycarbonate component in the absence of the recycled polycarbonate, the same amount of a reference impact modifier component, consisting essentially of the virgin impact modifier in the absence of the recycled impact modifier; the same amount of a reference flow promoter component, consisting essentially of the virgin flow promoter in the absence of the recycled flow promoter; and the same amount of the same mineral filler component.

In one aspect, the invention pertains to polycarbonate blend compositions, comprising: a) a virgin polycarbonate component; b) a virgin impact modifier component; c) a virgin flow promoter component; and d) a recycled polycarbonate blend composition comprising: i) a recycled polycarbonate component; ii) a recycled impact modifier component; and iii) a recycled flow promoter component; wherein a molded part formed from the composition exhibits less splay than that of a polycarbonate blend reference composition, wherein the polycarbonate blend reference composition comprises: a) a reference polycarbonate component consisting essentially of same amount the virgin polycarbonate component and a recycled reference polycarbonate component in an amount essentially the same as the recycled polycarbonate component, wherein the recycled reference polycarbonate component is a virgin polycarbonate essentially the same as the polycarbonate present in the recycled polycarbonate blend composition prior to recycling; b) a reference impact modifier component consisting essentially of same amount the virgin impact modifier component and a recycled reference impact modifier component in an amount essentially the same as the recycled impact modifier component, wherein the recycled reference impact modifier component is a virgin impact modifier essentially the same as the impact modifier present in the recycled polycarbonate blend composition prior to recycling; and c) a reference flow promoter component consisting essentially of same amount the virgin flow promoter component and a recycled reference flow promoter component in an amount essentially the same as the recycled flow promoter component, wherein the recycled reference flow promoter component is a virgin flow promoter essentially the same as the flow promoter present in the recycled polycarbonate blend composition prior to recycling.

In various aspects, the invention pertains to polycarbonate blend compositions, comprising: a) a virgin polycarbonate component; b) a virgin impact modifier component; c) a virgin flow promoter component; d) a mineral filler component; and e) a recycled polycarbonate blend composition comprising: i) a recycled polycarbonate component; ii) a recycled impact modifier component; and iii) a recycled flow promoter component; wherein a molded part formed from the composition exhibits at least about 25% less splay than that of a polycarbonate blend reference composition, wherein the polycarbonate blend reference composition comprises: a) a reference polycarbonate component consisting essentially of same amount the virgin polycarbonate component and a recycled reference polycarbonate component in an amount essentially the same as the recycled polycarbonate component, wherein the recycled reference polycarbonate component is a virgin polycarbonate essentially the same as the polycarbonate present in the recycled polycarbonate blend composition prior to recycling; b) a reference impact modifier component consisting essentially of same amount the virgin impact modifier component and a recycled reference impact modifier component in an amount essentially the same as the recycled impact modifier component, wherein the recycled reference impact modifier component is a virgin impact modifier essentially the same as the impact modifier present in the recycled polycarbonate blend composition prior to recycling; c) a reference flow promoter component consisting essentially of same amount the virgin flow promoter component and a recycled reference flow promoter component in an amount essentially the same as the recycled flow promoter component, wherein the recycled reference flow promoter component is a virgin flow promoter essentially the same as the flow promoter present in the recycled polycarbonate blend composition prior to recycling; and d) d) essentially the same amount of the mineral filler component.

In a further aspect, the virgin polycarbonate component is present in an amount from about 60 wt % to about 85 wt %. In a still further aspect, the virgin polycarbonate component is present in an amount from about 60 wt % to about 75 wt %. In a yet further aspect, the virgin polycarbonate component is present in an amount from about 65 wt % to about 72 wt %.

In a further aspect, the virgin polycarbonate component comprises a homopolymer polycarbonate of bisphenol A. In a still further aspect, the virgin polycarbonate component comprises a blend of at least two virgin polycarbonates.

In various aspects, wherein the virgin polycarbonate component has a weight average molecular weight ($M_w$) from about 15,000 g/mol to about 100,000 g/mol on an absolute PC molecular weight scale. In a still further aspect, the virgin polycarbonate component has a $M_w$ from about 15,000 g/mol to about 50,000 g/mol on an absolute PC molecular weight scale. In a yet further aspect, the virgin polycarbonate component has a $M_w$ from about 15,000 g/mol to about 40,000 g/mol on an absolute PC molecular weight scale. In an even further aspect, the virgin polycarbonate component has a $M_w$ from about 15,000 g/mol to about 35,000 g/mol on an absolute PC molecular weight scale. In a still further aspect, the virgin polycarbonate component has a $M_w$ from about 15,000 g/mol to about 30,000 g/mol on an absolute PC molecular weight scale.

In a further aspect, wherein the virgin polycarbonate component has a weight average molecular weight ($M_w$) from about 20,000 g/mol to about 100,000 g/mol on an absolute PC molecular weight scale. In a still further aspect, the virgin polycarbonate component has a $M_w$ from about 20,000 g/mol to about 50,000 g/mol on an absolute PC molecular weight scale. In a still further aspect, the virgin polycarbonate component has a $M_w$ from about 20,000 g/mol to about 40,000 g/mol on an absolute PC molecular weight scale. In an even further aspect, the virgin polycarbonate component has a $M_w$ from about 20,000 g/mol to about 35,000 g/mol on an absolute PC molecular weight scale. In a still further aspect, the virgin polycarbonate component has a $M_w$ from about 20,000 g/mol to about 30,000 g/mol on an absolute PC molecular weight scale.

In a further aspect, wherein the virgin polycarbonate component has a weight average molecular weight ($M_w$) from about 22,000 g/mol to about 100,000 g/mol on an absolute PC molecular weight scale. In a still further aspect, the virgin polycarbonate component has a $M_w$ from about 22,000 g/mol to about 50,000 g/mol on an absolute PC molecular weight scale. In a still further aspect, the virgin polycarbonate component has a $M_w$ from about 22,000 g/mol to about 40,000 g/mol on an absolute PC molecular weight scale. In an even further aspect, the virgin polycarbonate component has a $M_w$ from about 22,000 g/mol to about 35,000 g/mol on an absolute PC molecular weight scale. In a still further aspect, the virgin polycarbonate component has a $M_w$ from about 22,000 g/mol to about 30,000 g/mol on an absolute PC molecular weight scale.

In a further aspect, wherein the virgin polycarbonate component has a weight average molecular weight ($M_w$) from about 25,000 g/mol to about 100,000 g/mol on an absolute PC molecular weight scale. In a still further aspect, the virgin polycarbonate component has a $M_w$ from about 25,000 g/mol to about 50,000 g/mol on an absolute PC molecular weight scale. In a still further aspect, the virgin polycarbonate component has a $M_w$ from about 25,000 g/mol to about 40,000 g/mol on an absolute PC molecular weight scale. In an even further aspect, the virgin polycarbonate component has a $M_w$ from about 25,000 g/mol to about 35,000 g/mol on an absolute PC molecular weight scale. In a still further aspect, the virgin polycarbonate component has a $M_w$ from about 25,000 g/mol to about 30,000 g/mol on an absolute PC molecular weight scale.

In a further aspect, the recycled polycarbonate component is present in an amount from about 10 wt % to about 45 wt %. In a still further aspect, the recycled polycarbonate component is present in an amount from about 15 wt % to about 40 wt %. In a yet further aspect, the recycled polycarbonate component is present in an amount from about 15 wt % to about 30 wt %.

In a further aspect, the recycled polycarbonate component is essentially the same as the virgin polycarbonate prior to recycling. In a still further aspect, the recycled polycarbonate component comprises a homopolymer polycarbonate of bisphenol A. In a yet further aspect, the recycled polycarbonate component comprises a blend of at least two recycled polycarbonates.

In various aspects, wherein the recycled polycarbonate component has a weight average molecular weight ($M_w$) from about 15,000 g/mol to about 100,000 g/mol on an absolute PC molecular weight scale. In a still further aspect, the recycled polycarbonate component has a $M_w$ from about 15,000 g/mol to about 50,000 g/mol on an absolute PC molecular weight scale. In a yet further aspect, the recycled polycarbonate component has a $M_w$ from about 15,000 g/mol to about 40,000 g/mol on an absolute PC molecular weight scale. In an even further aspect, the recycled polycarbonate component has a $M_w$ from about 15,000 g/mol to about 35,000 g/mol on an absolute PC molecular weight scale. In a still further aspect, the recycled polycarbonate component has a $M_w$ from about 15,000 g/mol to about 30,000 g/mol on an absolute PC molecular weight scale.

In a further aspect, wherein the recycled polycarbonate component has a weight average molecular weight ($M_w$) from about 20,000 g/mol to about 100,000 g/mol on an absolute PC molecular weight scale. In a still further aspect, the recycled polycarbonate component has a $M_w$ from about 20,000 g/mol to about 50,000 g/mol on an absolute PC molecular weight scale. In a still further aspect, the recycled polycarbonate component has a $M_w$ from about 20,000 g/mol to about 40,000 g/mol on an absolute PC molecular weight scale. In an even further aspect, the recycled polycarbonate component has a $M_w$ from about 20,000 g/mol to about 35,000 g/mol on an absolute PC molecular weight scale. In a still further aspect, the recycled polycarbonate component has a $M_w$ from about 20,000 g/mol to about 30,000 g/mol on an absolute PC molecular weight scale.

In a further aspect, wherein the recycled polycarbonate component has a weight average molecular weight ($M_w$) from about 22,000 g/mol to about 100,000 g/mol on an absolute PC molecular weight scale. In a still further aspect, the recycled polycarbonate component has a $M_w$ from about 22,000 g/mol to about 50,000 g/mol on an absolute PC molecular weight scale. In a still further aspect, the recycled polycarbonate component has a $M_w$ from about 22,000 g/mol to about 40,000 g/mol on an absolute PC molecular weight scale. In an even further aspect, the recycled polycarbonate component has a $M_w$ from about 22,000 g/mol to about 35,000 g/mol on an absolute PC molecular weight scale. In a still further aspect, the recycled polycarbonate component has a $M_w$ from about 22,000 g/mol to about 30,000 g/mol on an absolute PC molecular weight scale.

In a further aspect, wherein the recycled polycarbonate component has a weight average molecular weight ($M_w$) from about 25,000 g/mol to about 100,000 g/mol on an absolute PC molecular weight scale. In a still further aspect, the recycled polycarbonate component has a $M_w$ from about 25,000 g/mol to about 50,000 g/mol on an absolute PC molecular weight scale. In a still further aspect, the recycled polycarbonate component has a $M_w$ from about 25,000 g/mol to about 40,000 g/mol on an absolute PC molecular weight scale. In an even further aspect, the recycled polycarbonate component has a $M_w$ from about 25,000 g/mol to about 35,000 g/mol on an absolute PC molecular weight scale. In a still further aspect, the recycled polycarbonate component has a $M_w$ from about 25,000 g/mol to about 30,000 g/mol on an absolute PC molecular weight scale.

In a further aspect, the virgin impact modifier comprises one more of an acrylonitrile butadiene styrene ("ABS"), a methacrylate butadiene styrene ("MBS"), and a bulk polymerized ABS ("BABS"). In a still further aspect, the virgin impact modifier comprises an acrylonitrile butadiene styrene ("ABS") impact modifier. In a yet further aspect, the virgin impact modifier comprises a methacrylate butadiene styrene ("MBS") impact modifier. In an even further aspect, the virgin impact modifier comprises a bulk polymerized ABS ("BABS") impact modifier.

In a further aspect, the virgin impact modifier component is present in an amount from about 0.1 wt % to about 30 wt %. In a still further aspect, the virgin impact modifier component is present in an amount from about 0.5 wt % to about 10 wt %. In a yet further aspect, the virgin impact modifier component is present in an amount from about 0.5 wt % to about 5 wt %.

In a further aspect, the recycled impact modifier component is essentially the same as the virgin impact modifier component prior to recycling.

In a further aspect, the recycled impact modifier comprises one more of an acrylonitrile butadiene styrene ("ABS"), a methacrylate butadiene styrene ("MBS"), and a bulk polymerized ABS ("BABS"). In a still further aspect, the recycled impact modifier comprises an acrylonitrile butadiene styrene ("ABS") impact modifier. In a yet further aspect, the recycled impact modifier comprises a methacrylate butadiene styrene ("MBS") impact modifier. In an even further aspect, the recycled impact modifier comprises a bulk polymerized ABS ("BABS") impact modifier.

In a further aspect, the recycled impact modifier component is present in an amount from about 0.1 wt % to about 30 wt %. In a still further aspect, the recycled impact modifier component is present in an amount from about 0.1 wt % to about 10 wt %. In a yet further aspect, the recycled impact modifier component is present in an amount from about 0.1 wt % to about 5 wt %.

In a further aspect, the virgin flow promoter comprises a flow promoter selected from a styrene acrylonitrile (SAN) flow promoter and a poly(methyl methacrylate) (PMMA) flow promoter, or combinations thereof. In a still further aspect, the virgin flow promoter comprises a styrene acrylonitrile (SAN) flow promoter. In a yet further aspect, the virgin flow promoter comprises a poly(methyl methacrylate) (PMMA) flow promoter.

In a further aspect, the virgin flow promoter component is present in an amount from about 1 wt % to about 25 wt %. In a still further aspect, the virgin flow promoter component is present in an amount from about 1 wt % to about 10 wt %. In a yet further aspect, the virgin flow promoter component is present in an amount from about 1 wt % to about 5 wt %.

In a further aspect, the recycled flow promoter component is essentially the same as the virgin flow promoter component prior to recycling.

In a further aspect, the recycled flow promoter comprises a flow promoter selected from a styrene acrylonitrile (SAN) flow promoter and a poly(methyl methacrylate) (PMMA) flow promoter, or combinations thereof. In a still further aspect, the recycled flow promoter comprises a styrene acrylonitrile (SAN) flow promoter. In a yet further aspect, the recycled flow promoter comprises a poly(methyl methacrylate) (PMMA) flow promoter.

In a further aspect, the recycled flow promoter component is present in an amount from about 1 wt % to about 25 wt %. In a still further aspect, the recycled flow promoter component is present in an amount from about 1 wt % to about 10 wt %. In a yet further aspect, the recycled flow promoter component is present in an amount from about 1 wt % to about 5 wt %.

In a further aspect, the recycled polycarbonate component comprises a recycled polycarbonate derived from post-industrial recycled (PIR) polycarbonate. In a still further aspect, the recycled polycarbonate component comprises a recycled polycarbonate derived from post-consumer recycled (PCR) polycarbonate.

Polycarbonate Blends

The disclosed polycarbonate compositions comprise a polycarbonate blend. The polycarbonate blend is generally comprised of at least a first and a second polycarbonate component, wherein the first polycarbonate component comprises a virgin polycarbonate material and the second polycarbonate component comprises a recycled or reclaimed polycarbonate material. According to aspects of the invention, the recycled or reclaimed virgin polycarbonate material present in the second polycarbonate component was essentially the same as the virgin polycarbonate material present in the first polycarbonate component prior to being incorporated into the material or composition from which it was reclaimed. For example, according to aspects of the invention, reference to the term essentially the same as it refers to the reclaimed polycarbonate material includes a recycled polycarbonate that when in the virgin state was chemically at least substantially identical to the virgin polycarbonate present in the first polycarbonate component. It should also be understood that as used herein, the phrase polycarbonate blend, does not specifically require the first and second polycarbonate components to be physically blended together prior to incorporation into the disclosed compositions nor does the phrase specifically require that the first and second polycarbonate components be present in the disclosed polycarbonate compositions in any particular blended manner. Rather, use of the phrase polycarbonate blend, unless the context indicates otherwise, simply refers to the presence of the first and second polycarbonate components within the disclosed polycarbonate compositions generally.

According to various aspects, the polycarbonate blend can be present in the disclosed polycarbonate compositions in any desired amount. For example, according to some aspects, the polycarbonate blend can be present in amounts ranging from about 40 wt % to about 85 wt % of the total polycarbonate composition, including for example, about 45, about 50, about 55, about 60, about 65, about 70, about 75, or about 85 wt % of the polycarbonate composition. In another aspect, the polycarbonate blend can be present in an amount from about 55 wt % to about 85 wt %. In another aspect, the polycarbonate blend can be present in an amount from about 60 wt % to about 75 wt %. In an even further aspect, the polycarbonate blend can be present in an amount of from about 65 wt % to about 72 wt % of the disclosed polycarbonate composition.

Within the polycarbonate blend, the relative amount of virgin polycarbonate material and reclaimed polycarbonate material can also vary as desired. For example, and without limitation, the virgin polycarbonate material can be present in the polycarbonate blend in an amount relative to the total amount of polycarbonate material within the polycarbonate blend of about 60 wt % to about 99 wt % including about 65, 70, 75, 80, 85, 90, and 95 wt %. Similarly, the reclaimed polycarbonate material can, for example, be present in the polycarbonate blend in an amount relative to the total amount of polycarbonate material within the polycarbonate blend of about 1 wt % to about 40 wt % including about 5, 10, 15, 20, 25, 30, and 35 wt %.

The recycled polycarbonate material can be obtained from any source material comprising the desired polycarbonate material. For example, the recycled polycarbonate material can be obtained from a post-industrial source or, alternatively, from a post-consumer source, or still further from a combination of post-industrial and post-consumer sources. Exemplary sources of reclaimed material include quality control rejections during the manufacturing process, sprues from injection molding, start-up material from injection molding and extrusion, or edge trims from extruder sheets, or films, or from rejected parts; or post-consumer recycled materials, such as those collected and treated after utilization by end consumers. Said recycled materials may also be used as pellets or as regrind material.

The term polycarbonate as used herein is not intended to refer to a specific polycarbonate or group of polycarbonates, but rather refers to the any one of the class of compounds containing a repeating chain of carbonate groups. In one aspect, a polycarbonate material can include any one or more of those polycarbonate materials disclosed and described in U.S. Pat. No. 7,786,246, which is hereby incorporated by reference in its entirety for the specific purpose of disclosing various polycarbonate compositions and methods for manufacture of same.

In one aspect, a virgin polycarbonate material as disclosed herein can be an aliphatic-diol based polycarbonate. In another aspect, the virgin polycarbonate component can comprise a carbonate unit derived from a dihydroxy compound, such as, for example, a bisphenol that differs from the aliphatic diol. In still further aspects, the exemplary first polycarbonate component includes aromatic polycarbonates conventionally manufactured through a transesterification reaction of an one or more aromatic dihydroxy compound(s) and a carbonic acid diester in the presence of one or more catalyst(s).

In one aspect, non-limiting examples of suitable bisphenol compounds include the following: 4,4'-dihydroxybiphenyl, 1,6-dihydroxynaphthalene, 2,6-dihydroxynaphthalene, bis (4-hydroxyphenyl)methane, bis(4-hydroxyphenyl)diphenyl-methane, bis(4-hydroxyphenyl)-1-naphthylmethane, 1,2-bis (4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxy-3methylphenyl)cyclohexane 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2, 2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

In another aspect, exemplary bisphenol compounds can comprise 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PPPBP"), and 9,9-bis(4-hydroxyphenyl)fluorene. Combinations comprising at least one dihydroxy aromatic compound can also be used. In another aspect, other types of diols can be present in the polycarbonate.

In a yet another aspect, polycarbonates with branching groups can be useful, provided that such branching does not significantly adversely affect desired properties of the polycarbonate. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha,alpha-dimethylbenzyl)phenol), 4-chloroformyl phthalic anhydride, trimesic acid, and benzophenone tetracarboxylic acid. In one aspect, a branching agent can be added at a level of about 0.05 to about 2.0 wt %. In a still another aspect, mixtures comprising linear polycarbonates and branched polycarbonates can be used.

The first polycarbonate component can comprise virgin copolymers comprising carbonate units and other types of polymer units, including ester units, and combinations comprising at least one of homopolycarbonates and copolycarbonates. An exemplary polycarbonate copolymer of this type is a polyester carbonate, also known as a polyester-polycarbonate. Such copolymers further contain carbonate units derived from oligomeric ester-containing dihydroxy compounds (also referred to herein as hydroxy end-capped oligomeric acrylate esters). In another aspect, the first polycarbonate component does not comprise a separate polymer such as a polyester. In one aspect, an aliphatic-based polycarbonate comprises aliphatic units that are either aliphatic carbonate units derived from aliphatic diols, or a combination of aliphatic ester units derived from aliphatic diacids having greater than 13 carbons.

In one aspect, the molecular weight of any particular polycarbonate can be determined by, for example, gel permeation chromatography using universal calibration methods based on polycarbonate (PC) standards. Generally polycarbonates can have a weight average molecular weight ($M_w$), of greater than about 5,000 g/mol based on PC standards. In one aspect, the polycarbonates can have an $M_w$ of greater than or equal to about 20,000 g/mol, based on PC standards. In another aspect, the polycarbonates have an $M_w$ based on PC standards of about 20,000 to 100,000 g/mol, including for example 30,000 g/mol, 40,000 g/mol, 50,000 g/mol, 60,000 g/mol, 70,000 g/mol, 80,000 g/mol, or 90,000 g/mol. In still further aspects, the polycarbonates have an $M_w$ based on PCS standards of about 22,000 to about 50,000 g/mol. In still further aspects, the polycarbonates have an $M_w$ based on PC standards of about 25,000 to 40,000 g/mol.

Molecular weight ($M_w$ and $M_n$) as described herein, and polydispersity as calculated therefrom, can be determined using gel permeation chromatography (GPC), using a crosslinked styrene-divinylbenzene column and PC standards, preferably PC standards that are certified or traceable, e.g. DIN certified PC standards. GPC samples can be prepared in a solvent such as methylene chloride or chloroform at a concentration of about 1 mg/ml, and can be eluted at a flow rate of about 0.2 to 1.0 ml/min.

In various aspects, the glass transition temperature (Tg) of a polycarbonate can be less than or equal to about 160° C., less than or equal to about 150° C., less than or equal to about 145° C., less than or equal to about 140° C., or less than or equal to about 135° C. In a further aspect, the glass transition temperature of a polycarbonate can be from about 85° C. to about 220° C., from about 90° C. to about 160° C., from about 90° C. to about 150° C., or from about 90° C. to about 145° C. In a still further aspect, the glass transition temperature of a polycarbonate can be from about 85° C. to about 130° C., from about 90° C. to about 130° C., from about 90° C. to about 125° C., or from about 90° C. to about 120° C.

In one aspect, polycarbonates can be manufactured using an interfacial phase transfer process or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium such as for example methylene chloride, and contacting the reactants with a carbonate precursor (such as phosgene) in the presence of a catalyst such as, for example, triethylamine or a phase transfer catalyst salt, under controlled pH conditions of, for example, about 8 to about 10.

The polycarbonate can, in various aspects, be prepared by a melt polymerization process. Generally, in the melt polymerization process, polycarbonates are prepared by co-reacting, in a molten state, the dihydroxy reactant(s) and a diaryl carbonate ester, such as diphenyl carbonate, or more specifically in an aspect, an activated carbonate such as bis(methyl salicyl)carbonate, in the presence of a transesterification catalyst. The reaction can be carried out in typical polymerization equipment, such as one or more continuously stirred reactors (CSTRs), plug flow reactors, wire wetting fall polymerizers, free fall polymerizers, wiped film polymerizers, BANBURY® mixers, single or twin screw extruders, or combinations of the foregoing. In one aspect, volatile monohydric phenol can be removed from the molten reactants by distillation and the polymer is isolated as a molten residue. In another aspect, a useful melt process for making polycarbonates utilizes a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl)carboxylate, bis(4-acetylphenyl)carboxylate, or a combination comprising at least one of the foregoing.

The melt polymerization can include a transesterification catalyst comprising a first catalyst, also referred to herein as an alpha catalyst, comprising a metal cation and an anion. In one aspect, the cation is an alkali or alkaline earth metal comprising Li, Na, K, Cs, Rb, Mg, Ca, Ba, Sr, or a combination comprising at least one of the foregoing. The anion is hydroxide (OH), superoxide ($O_2^-$), thiolate ($HS^-$), sulfide ($S_2^-$), a $C_{1-20}$ alkoxide, a $C_{6-20}$ aryloxide, a $C_{1-20}$ carboxylate, a phosphate including biphosphate, a $C_{1-20}$ phosphonate, a sulfate including bisulfate, sulfites including bisulfites and metabisulfites, a $C_{1-20}$ sulfonate, a carbonate including bicarbonate, or a combination comprising at least one of the foregoing. In another aspect, salts of an organic acid comprising both alkaline earth metal ions and alkali metal ions can also be used. Salts of organic acids useful as catalysts are illustrated by alkali metal and alkaline earth metal salts of formic acid, acetic acid, stearic acid and ethyelenediamine tetraacetic acid. The catalyst can also comprise the salt of a non-volatile inorganic acid. By "nonvolatile", it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Exemplary transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, $NaH_2PO_3$, $NaH_2PO_4$, $Na_2H_2PO_3$, $KH_2PO_4$, $CsH_2PO_4$, $Cs_2H_2PO_4$, $Na_2SO_3$, $Na_2S_2O_5$, sodium mesylate, potassium mesylate, sodium tosylate, potassium tosylate, magnesium disodium ethylenediamine tetraacetate (EDTA magnesium disodium salt), or a combination comprising at least one of the foregoing. It will be understood that the foregoing list is exemplary and should not be considered as limited thereto. In one aspect, the transesterification catalyst is an alpha catalyst comprising an alkali or alkaline earth salt. In an exemplary aspect, the transesterification catalyst comprising sodium hydroxide, potassium hydroxide, sodium carbonate, potassium carbonate, sodium methoxide, potassium methoxide, $NaH_2PO_4$, or a combination comprising at least one of the foregoing.

The amount of alpha catalyst can vary widely according to the conditions of the melt polymerization, and can be about 0.001 to about 500 mmol. In an aspect, the amount of alpha catalyst can be about 0.01 to about 20 μmol, specifically about 0.1 to about 10 μmol, more specifically about 0.5 to about 9 μmol, and still more specifically about 1 to about 7 μmol, per mole of aliphatic diol and any other dihydroxy compound present in the melt polymerization. In another aspect, a second transesterification catalyst, also referred to herein as a beta catalyst, can optionally be included in the melt polymerization process, provided that the inclusion of such a second transesterification catalyst does not significantly adversely affect the desirable properties of the polycarbonate. Exemplary transesterification catalysts can further include a combination of a phase transfer catalyst of formula (R3)4Q+X above, wherein each R3 is the same or different, and is a $C_{1-10}$ alkyl group; Q is a nitrogen or phosphorus atom; and X is a halogen atom or a C1-8 alkoxy group or C6-18 aryloxy group. Exemplary phase transfer catalyst salts include, for example, [CH3(CH2)3]4NX, [CH3(CH2)3]4PX, [CH3(CH2)5]4NX, [CH3(CH2)6]4NX, [CH3(CH2)4]4NX, CH3[CH3(CH2)3]3NX, and CH3[CH3(CH2)2]3NX, wherein X is Cl–, Br–, a C1-8 alkoxy group or a C6-18 aryloxy group. Examples of such transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In various aspects, where a beta catalyst is desired, the beta catalyst can be present in a molar ratio, relative to the alpha catalyst, of less than or equal to 10, specifically less than or equal to 5, more specifically less than or equal to 1, and still more specifically less than or equal to 0.5. In other aspects, the melt polymerization reaction disclosed herein uses only an alpha catalyst as described hereinabove, and is substantially free of any beta catalyst. As defined herein, "substantially free of" can mean where the beta catalyst has been excluded from the melt polymerization reaction. In one aspect, the beta catalyst is present in an amount of less than about 10 ppm, specifically less than 1 ppm, more specifically less than about 0.1 ppm, more specifically less than or equal to about 0.01 ppm, and more specifically less than or equal to about 0.001 ppm, based on the total weight of all components used in the melt polymerization reaction.

In one aspect, a melt process employing an activated carbonate is utilized. As used herein, the term "activated carbonate", is defined as a diarylcarbonate that is more reactive than diphenylcarbonate in transesterification reactions. Specific non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate. Examples of specific ester-substituted diarylcarbonates include, but are not limited to, bis(methylsalicyl)carbonate (CAS Registry No. 82091-12-1) (also known as BMSC or bis(o-methoxycarbonylphenyl)carbonate), bis(ethylsalicyl)carbonate, bis(propylsalicyl)carbonate, bis(butylsalicyl)carbonate, bis(benzylsalicyl)carbonate, bis(methyl-4-chlorosalicyl)carbonate and the like. In one aspect, bis(methylsalicyl)carbonate is used as the activated carbonate in melt polycarbonate synthesis due to its lower molecular weight and higher vapor pressure. Some non-limiting examples of non-activating groups which, when present in an ortho position, would not be expected to result in activated carbonates are alkyl, cycloalkyl or cyano groups. Some specific and non-limiting examples of non-activated carbonates are bis(o-methylphenyl)carbonate, bis(p-cumylphenyl)carbonate, bis(p-(1,1,3,3-tetramethyl)butylphenyl)carbonate and bis(o-cyanophenyl)carbonate. Unsymmetrical combinations of these structures can also be used as non-activated carbonates.

In one aspect, an end-capping agent (also referred to as a chain-stopper) can optionally be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and C1-C22 alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms can be specifically mentioned. Certain monophenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

In another aspect, endgroups can be derived from the carbonyl source (i.e., the diaryl carbonate), from selection of monomer ratios, incomplete polymerization, chain scission, and the like, as well as any added end-capping groups, and can include derivatizable functional groups such as hydroxy groups, carboxylic acid groups, or the like. In one aspect, the endgroup of a polycarbonate can comprise a structural unit derived from a diaryl carbonate, where the structural unit can be an endgroup. In a further aspect, the endgroup is derived from an activated carbonate. Such endgroups can be derived from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups. In another aspect, the ester endgroup derived from a salicylic ester can be a residue of BMSC or other substituted or unsubstituted bis(alkyl salicyl)carbonate such as bis(ethyl salicyl)carbonate, bis(propyl salicyl)carbonate, bis(phenyl salicyl)carbonate, bis(benzyl salicyl)carbonate, or the like. In one aspect, where a combination of alpha and beta catalysts are used in the melt polymerization, a polycarbonate polymer prepared from an activated carbonate can comprise endgroups in an amount of less than 2,000 ppm, less than 1,500 ppm, or less than 1,000 ppm, based on the weight of the polycarbonate. In another aspect, where only an alpha catalyst is used in the melt polymerization, a polycarbonate polymer prepared from an activated carbonate can comprise endgroups in an amount of less than or equal to 500 ppm, less than or equal to 400 ppm, less than or equal to 300 ppm, or less than or equal to 200 ppm, based on the weight of the polycarbonate.

In one aspect, the reactants for the polymerization reaction using an activated aromatic carbonate can be charged into a reactor either in the solid form or in the molten form. Initial charging of reactants into a reactor and subsequent mixing of these materials under reactive conditions for polymerization can be conducted in an inert gas atmosphere such as a nitrogen atmosphere. The charging of one or more reactants can also be done at a later stage of the polymerization reaction. Mixing of the reaction mixture is accomplished by any methods known in the art, such as by stirring. Reactive conditions include time, temperature, pressure and other factors that affect polymerization of the reactants. Typically the activated aromatic carbonate is added at a mole ratio of 0.8 to 1.3, and more preferably 0.9 to 1.3, and all subranges there between, relative to the total moles of monomer unit compounds (i.e., aromatic dihydroxy compound, and aliphatic diacid or diol). In a specific aspect, the molar ratio of activated aromatic carbonate to monomer unit compounds is 1.013 to 1.29, specifically 1.015 to 1.028. In another specific aspect, the activated aromatic carbonate is BMSC.

In one aspect, the melt polymerization reaction can be conducted by subjecting the reaction mixture to a series of temperature-pressure-time protocols. In some aspects, this involves gradually raising the reaction temperature in stages while gradually lowering the pressure in stages. In one aspect, the pressure is reduced from about atmospheric pressure at the start of the reaction to about 1 millibar (100 Pa) or lower, or in another aspect to 0.1 millibar (10 Pa) or lower in several steps as the reaction approaches completion. The temperature can be varied in a stepwise fashion beginning at a temperature of about the melting temperature of the reaction mixture and subsequently increased to final temperature. In one aspect, the reaction mixture is heated from room temperature to about 150° C. In such an aspect, the polymerization reaction starts at a temperature of about 150° C. to about 220° C. In another aspect, the polymerization temperature can be up to about 220° C. In other aspects, the polymerization reaction can then be increased to about 250° C. and then optionally further increased to a temperature of about 320° C., and all subranges there between. In one aspect, the total reaction time can be from about 30 minutes to about 200 minutes and all subranges there between. This procedure will generally ensure that the reactants react to give polycarbonates with the desired molecular weight, glass transition temperature and physical properties. The reaction proceeds to build the polycarbonate chain with production of ester-substituted alcohol by-product such as methyl salicylate. In one aspect, efficient removal of the by-product can be achieved by different techniques such as reducing the pressure. Generally the pressure starts relatively high in the beginning of the reaction and is lowered progressively throughout the reaction and temperature is raised throughout the reaction.

In one aspect, the progress of the reaction can be monitored by measuring the melt viscosity or the weight average molecular weight of the reaction mixture using techniques known in the art such as gel permeation chromatography. These properties can be measured by taking discrete samples or can be measured on-line. After the desired melt viscosity and/or molecular weight is reached, the final polycarbonate product can be isolated from the reactor in a solid or molten form. It will be appreciated by a person skilled in the art, that the method of making aliphatic homopolycarbonate and aliphatic-aromatic copolycarbonates as described in the preceding sections can be made in a batch or a continuous process and the process disclosed herein is preferably carried out in a solvent free mode. Reactors chosen should ideally be self-cleaning and should minimize any "hot spots." However, vented extruders similar to those that are commercially available can be used.

In one aspect, the aliphatic homopolycarbonate and aliphatic-aromatic copolycarbonate can be prepared in an extruder in presence of one or more catalysts, wherein the carbonating agent is an activated aromatic carbonate. In one aspect, the reactants for the polymerization reaction can be fed to the extruder in powder or molten form. In another aspect, the reactants are dry blended prior to addition to the extruder. The extruder can be equipped with pressure reducing devices (e.g., vents), which serve to remove the activated phenol by-product and thus drive the polymerization reaction toward completion. The molecular weight of the polycarbonate product can, in various aspects, be manipulated by controlling, among other factors, the feed rate of the reactants, the type of extruder, the extruder screw design and configuration, the residence time in the extruder, the reaction temperature and the pressure reducing techniques present on the extruder. The molecular weight of the polycarbonate product can also depend upon the structures of the reactants, such as, activated aromatic carbonate, aliphatic diol, dihydroxy aromatic compound, and the catalyst employed. Many different screw designs and extruder configurations are commercially available that use single screws, double screws, vents, back flight and forward flight zones, seals, and sidestreams. One skilled in the art can find the best designs using generally known principals of commercial extruder design. Controlling the ratio diarylcarbonate/diol, specifically BMSC/diol can impact the Mw when using an activated carbonate. A lower ratio can generally give a higher molecular weight.

In a further aspect, the first polycarbonate component in disclosed polycarbonate blend composition comprises a virgin homopolymer polycarbonate of bisphenol A. In still a further aspect, the first polycarbonate component in disclosed polycarbonate blend composition comprises at least two different virgin homopolymer polycarbonate of bisphenol A.

Impact Modifier Blends

The disclosed polycarbonate compositions further comprise an impact modifier blend. The impact modifier blend is generally comprised of at least a first and a second impact modifier component, wherein the first impact modifier component comprises a virgin impact modifier material and the second impact modifier component comprises a recycled or reclaimed impact modifier. According to aspects of the invention, the recycled or reclaimed impact modifier material present in the second polycarbonate component was essentially the same as the virgin impact modifier material present in the first impact modifier component prior to being incorporated into the material or composition from which it was reclaimed. For example, according to aspects of the invention, reference to the term essentially the same as it refers to the reclaimed polycarbonate material includes a recycled impact modifier that when in the virgin state was chemically at least substantially identical to the virgin impact modifier present in the first impact modifier component. It should also be understood that as used herein, the phrase impact modifier blend does not specifically require the first and second impact modifier components to be physically blended together prior to incorporation into the disclosed compositions nor does the phrase specifically require that the first and second impact modifier components be present in the disclosed polycarbonate compositions in any particular blended manner. Rather, use of the phrase impact modifier blend, unless the context indicates otherwise, simply refers to the presence of the first and second impact modifier components within the disclosed polycarbonate compositions generally.

According to various aspects, the impact modifier blend can be present in the disclosed polycarbonate compositions in any desired amount. For example, according to some aspects, the impact modifier blend can be present in amounts ranging from greater than 0 wt % to about 25 wt % of the total polycarbonate composition, including for example, about 5, about 10, about 15, and about 20 wt % of the polycarbonate composition. In another aspect, the impact modifier blend can be present in an amount from about 2 wt % to about 18 wt % of the total polycarbonate composition, including for example, about 4, about 6, about 8, about 10, about 12, about 14, or about 16 wt % of the polycarbonate composition. In another aspect, the impact modifier blend can be present in an amount from about 3 wt % to about 10 wt %. In still a further aspect, the impact modifier blend can be present in an amount from about 4 wt % to about 8 wt % of the disclosed polycarbonate composition.

Within the impact modifier blend, the relative amount of virgin impact modifier material and reclaimed impact modifier material can also vary as desired. For example, and without limitation, the virgin impact modifier material can be present in the impact modifier blend in an amount relative to the total amount of impact modifier material within the impact modifier blend of about 60 wt % to about 99 wt % including about 65, 70, 75, 80, 85, 90, and 95 wt %. Similarly, the reclaimed impact modifier material can, for example, be present in the impact modifier blend in an amount relative to the total amount of impact modifier material within the impact modifier blend of about 1 wt % to about 40 wt % including about 5, 10, 15, 20, 25, 30, and 35 wt %.

The recycled impact modifier material can be obtained from any source material comprising the desired impact modifier material. For example, the recycled impact modifier material can be obtained from a post-industrial source or, alternatively, from a post-consumer source, or still further from a combination of post-industrial and post-consumer sources. Exemplary sources of reclaimed material include quality control rejections during the manufacturing process, sprues from injection molding, start-up material from injection molding and extrusion, or edge trims from extruder sheets, or films, or from rejected parts; or post-consumer recycled materials, such as those collected and treated after utilization by end consumers. Said recycled materials may also be used as pellets or as regrind material.

The virgin impact modifier can be a high molecular weight elastomeric material derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. In another aspect, a combination of any two or more individual impact modifiers can be used.

An exemplary type of impact modifier is an elastomer-modified graft copolymer comprising an elastomeric (i.e., rubbery) polymer substrate having a Tg less than about 10° C., less than about −10° C., or about −40° C. to −80° C., and a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric C1-8 alkyl(meth)acrylates; elastomeric copolymers of C1-8 alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the C1-6 esters of acrylic acid and methacrylic acid, specifically poly methyl methacrylate (PMMA), and copolymers of monovinyl aromatic monomers and monovinylic monomers.

Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and methyl methacrylate-butadiene (MB).

In one aspect, the impact modifier is preferably an acrylonitrile-butadiene-styrene (ABS) elastomer. In a further aspect, the impact modifier is preferably a methyl methacrylate-butadiene-styrene (MBS). Such impact modifiers are commercially available, and one of skill in the art, in possession of this disclosure, could readily select an appropriate impact modifier.

Flow Promoter Additive Blends

The disclosed polycarbonate compositions can optionally further comprise a flow promoter blend. The flow promoter blend is generally comprised of at least a first and a second flow promoter component, wherein the first flow promoter component comprises a virgin flow promoter material and the second flow promoter component comprises a recycled or reclaimed flow promoter. According to aspects of the invention, the recycled or reclaimed flow promoter material present in the second flow promoter component was essentially the same as the virgin flow promoter material present in the first flow promoter component prior to being incorporated into the material or composition from which it was reclaimed. For example, according to aspects of the invention, reference to the term essentially the same as it refers to the reclaimed flow promoter material includes a recycled flow promoter material that when in the virgin state was chemically at least substantially identical to the virgin flow promoter material present in the first flow promoter component. It should also be understood that as used herein, the phrase flow promoter blend does not specifically require the first and second flow promoter components to be physically blended together prior to incorporation into the disclosed compositions nor does the phrase specifically require that the first and second flow promoter components be present in the disclosed polycarbonate compositions in any particular blended manner. Rather, use of the phrase flow promoter blend, unless the context indicates otherwise, simply refers to the presence of the first and second flow promoter components within the disclosed polycarbonate compositions generally.

According to various aspects, the flow promoter blend can be present in the disclosed polycarbonate compositions in any desired amount. For example, according to some aspects, the flow promoter blend can be present in amounts ranging from greater than 0 wt % to about 25 wt % of the total polycarbonate composition, including for example, about 5, about 10, about 15, and about 20 wt % of the polycarbonate composition. In another aspect, the flow promoter blend can be present in an amount from about 2 wt % to about 18 wt % of the total polycarbonate composition, including for example, about 4, about 6, about 8, about 10, about 12, about 14, or about 16 wt % of the polycarbonate composition. In another aspect, the flow promoter blend can be present in an amount from about 5 wt % to about 15 wt %. In still a further aspect, the flow promoter blend can be present in an amount from about 7 wt % to about 12 wt % of the disclosed polycarbonate composition.

Within the flow promoter blend, the relative amount of virgin flow promoter material and reclaimed flow promoter material can also vary as desired. For example, and without limitation, the virgin flow promoter material can be present in the flow promoter blend in an amount relative to the total amount of flow promoter material within the flow promoter blend of about 60 wt % to about 99 wt % including about 65, 70, 75, 80, 85, 90, and 95 wt %. Similarly, the reclaimed flow promoter material can, for example, be present in the impact modifier blend in an amount relative to the total amount of impact modifier material within the flow promoter blend in an amount of about 1 wt % to about 40 wt % including about 5, 10, 15, 20, 25, 30, and 35 wt %.

The recycled flow promoter material can be obtained from any source material comprising the desired flow promoter material. For example, the recycled flow promoter material can be obtained from a post-industrial source or, alternatively, from a post-consumer source, or still further from a combination of post-industrial and post-consumer sources. Exemplary sources of reclaimed material include quality control rejections during the manufacturing process, sprues from injection molding, start-up material from injection molding and extrusion, or edge trims from extruder sheets, or films, or from rejected parts; or post-consumer recycled materials, such as those collected and treated after utilization by end consumers. Said recycled materials may also be used as pellets or as regrind material.

In a further aspect, the virgin flow promoter material can comprise a styrene acrylonitrile (SAN) flow promoter. In a yet further aspect, the virgin flow promoter material can comprise a poly(methyl methacrylate) ("PMMA").

Fillers

In one aspect, the inventive polycarbonate compositions can further comprise a filler, such as, for example, an inorganic filler or reinforcing agent. The specific composition of a filler, if present, can vary, provided that the filler is chemically compatible with the remaining components of the polycarbonate composition. In one aspect, the polycarbonate composition comprises a mineral filler. In another aspect, the polycarbonate blend composition comprises a filler comprising talc. If present, the amount of filler can comprise any amount suitable for a polycarbonate composition that does not adversely affect the desired properties thereof. In one aspect, the inventive polycarbonate blend composition comprises a filler in the amount of about 5 wt % to about 50 wt % of the polycarbonate blend composition. In a still further aspect, the filler in the polycarbonate blend composition is present in an amount of about 8 wt % to about 20 wt % of polycarbonate blend composition. In a yet further aspect, the filler in the polycarbonate blend composition is present in an amount of about 12 wt % to about 17 wt % of the polycarbonate blend composition. In another aspect, the filler in the polycarbonate blend composition is present in an amount of 15 wt % of the polycarbonate blend composition.

In another aspect, a filler can comprise silicates and silica powders, such as aluminum silicate (mullite), synthetic calcium silicate, zirconium silicate, fused silica, crystalline silica graphite, natural silica sand, or the like; boron powders, such as boron-nitride powder, boron-silicate powders, or the like; oxides, such as $TiO_2$, aluminum oxide, magnesium oxide, or the like; calcium sulfate (as its anhydride, dihydrate or trihydrate), or the like; talc, including fibrous, modular, needle shaped, lamellar talc, or the like; wollastonite; surface-treated wollastonite; glass spheres such as hollow and solid glass spheres, silicate spheres, aluminosilicate, or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers), carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), aromatic polyamides, aromatic polyimides, polyetherimides, polytetrafluoroethylene, or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

Flame Retardant Additive

The disclosed polycarbonate compositions can optionally further comprises a flame retardant additive. In various aspects, the flame retardant additive can comprise any flame retardant material or mixture of flame retardant materials suitable for use in the inventive composition. In another aspect, the flame retardant additive comprises a phosphate containing material. In another aspect, the flame retardant additive comprises a halogen containing material. In other aspects, the flame retardant additive is free of or substantially free of one or more of phosphate and/or a halogen. In still another aspect, the flame retardant additive comprises an oligomer organophosphorous flame retardant, including for example, bisphenol A diphenyl phosphate (BPADP). In a further aspect, the flame retardant is selected from oligomeric phosphate, polymeric phosphate, oligomeric phosphonate, or mixed phosphate/phosphonate ester flame retardant compositions. In a still further aspect, the flame retardant is selected from triphenyl phosphate; cresyldiphenylphosphate; tri(isopropylphenyl)phosphate; resorcinol bis(diphenylphosphate); and bisphenol-A bis(diphenyl phosphate). In a yet further aspect, the flame retardant is bisphenol-A bis(diphenyl phosphate).

The concentration of a flame retardant additive can vary, and the present invention is not intended to be limited to any particular flame retardant concentration. In one aspect, the disclosed composition comprises from about 5 weight % to about 20 wt % of flame retardant additive, including for example, about 6, 7, 8, 9, 10, 11, 12, 13, 14, 15, 16, 17, 18, or 19 weight %. In still further aspects, the flame retardant additive can be present in any range of amounts derived from the above values. For example, the flame retardant additive can be present in the polycarbonate composition in an amount in the range of from about 5 weight % to about 15 weight %, or event from about 10 weight percent to about 20 weight %. Flame retardant additives are commercially available, and one of skill in the art could readily select an appropriate flame retardant additive.

Other Optional Additives

In addition to the foregoing components, the disclosed polycarbonate compositions can optionally comprise a balance amount of one or more additive materials ordinarily incorporated in polycarbonate resin compositions of this type, with the proviso that the additives are selected so as to not significantly adversely affect the desired properties of the polycarbonate composition. Combinations of additives can be used. Such additives can be mixed at a suitable time during the mixing of the components for forming the composition. Exemplary and non-limiting examples of additive materials that can be present in the disclosed polycarbonate compositions include an antioxidant, a stabilizer (including for example a heat stabilizer, a hydrolytic stabilizer, or a light stabilizer), UV absorbing additive, plasticizer, lubricant, mold release agent, antistatic agent, colorant (e.g., pigment and/or dye), or any combination thereof.

In a yet another aspect, the disclosed polycarbonate blend compositions may further comprise a primary antioxidant or "stabilizer" (e.g., a hindered phenol) and, optionally, a secondary antioxidant (e.g., a phosphate and/or thioester). Suitable antioxidant additives include, for example, organic phosphites such as tris(nonyl phenyl)phosphite, tris(2,4-di-t-butylphenyl)phosphite, bis(2,4-di-t-butylphenyl) pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants are generally used in amounts of about 0.01 wt % to about 1 wt %, optionally about 0.05 wt % to about 0.5 wt % of the polycarbonate blend composition.

In various aspects, the disclosed polycarbonate blend composition further comprises a hydrolytic stabilizer, wherein the hydrolytic stabilizer comprises a hydrotalcite and an inorganic buffer salt. In a further aspect, the disclosed polycarbonate blend composition comprises a hydrolytic stabilizer, wherein the hydrolytic stabilizer comprises one or more hydrotalcites and an inorganic buffer salt comprising one or more inorganic salts capable of pH buffering. Either synthetic hydrotalcites or natural hydrotalcites can be used as the hydrotalcite compound in the present invention. Exemplary hydrotalcites that are useful in the compositions of the present are commercially available and include, but are not limited to, magnesium hydrotalcites such as DHT-4C (available from Kyowa Chemical Co.); Hysafe 539 and Hysafe 530 (available from J.M. Huber Corporation).

In a further aspect, suitable heat stabilizer additives include, for example, organic phosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, organic phosphates such as trimethyl phosphate, thioesters such as pentaerythritol betalaurylthiopropionate, and the like, or combinations comprising at least one of the foregoing heat stabilizers. Heat stabilizers are generally used in amounts of about 0.01 wt % to about 5 wt %, optionally about 0.05 wt % to about 0.3 wt % of the polycarbonate blend composition.

In a yet another aspect, light stabilizers and/or ultraviolet light (UV) absorbing additives may also be used. Suitable light stabilizer additives include, for example, benzotriazoles such as 2-(2-hydroxy-5-methylphenyl)benzotriazole, 2-(2-hydroxy-5-tert-octylphenyl)-benzotriazole and benzophenones such as 2-hydroxy-4-n-octoxy benzophenone, or the like, or combinations comprising at least one of the foregoing light stabilizers. Light stabilizers are generally used in amounts of about 0.01 wt % to about 10 wt %, optionally about 0.1 wt % to about 1 wt % of the polycarbonate blend composition.

In a further aspect, suitable UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB™ 5411); 2-hydroxy-4-n-octyloxybenzophenone (CYASORB™ 531); 2-[4,6-bis(2,4-dimethylphenyl)-1,3,5-triazin-2-yl]-5-(octyloxy)-phenol (CYASORB™ 1164); 2,2'-(1,4-phenylene)bis(4H-3,1-benzoxazin-4-one) (CYASORB™ UV-3638); 1,3-bis[(2-cyano-3,3-diphenylacryloyl)oxy]-2,2-bis[[(2-cyano-3,3-diphenylacryloyl)oxy]methyl]propane (UVINUL™ 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than about 100 nanometers; or the like, or combinations comprising at least one of the foregoing UV absorbers. UV absorbers are generally used in amounts of about 0.1 wt % to about 5 wt % of the polycarbonate blend composition.

In one aspect, plasticizers, lubricants, and/or mold release agents additives may also be used. There is a considerable overlap among these types of materials, which include, for example, di- or polyfunctional aromatic phosphates such as resorcinol tetraphenyl diphosphate (RDP), the bis(diphenyl) phosphate of hydroquinone and the bis(diphenyl)phosphate of bisphenol-A; poly-alpha-olefins; epoxidized soybean oil; silicones, including silicone oils; esters, for example, fatty acid esters such as medium and high molecular weight alkyl stearyl esters; mixtures of fatty acid esters and hydrophilic and hydrophobic nonionic surfactants comprising polyethylene glycol polymers, polypropylene glycol polymers, and copolymers thereof; waxes such as beeswax, montan wax, paraffin wax or the like. Such materials are generally used in amounts of about 0.1 wt % to about 20 wt %, optionally about 1 wt % to about 10 wt % the polycarbonate blend composition.

In a further aspect, colorants such as pigment and/or dye additives may also be present. Suitable pigments include for example, inorganic pigments such as metal oxides and mixed metal oxides such as zinc oxide, titanium dioxides, iron oxides or the like; sulfides such as zinc sulfides, or the like; aluminates; sodium sulfo-silicates sulfates, chromates, or the like; carbon blacks; zinc ferrites; ultramarine blue; Pigment Brown 24; Pigment Red 101; Pigment Yellow 119; organic pigments such as azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes; Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150, or combinations comprising at least one of the foregoing pigments. Pigments are generally used in amounts of about 0.01 wt % to about 10 wt %, the polycarbonate blend composition.

In a yet further aspect, suitable dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'',5''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene; chrysene; rubrene; coronene, or the like, or amounts of about 0.1 to about 10 ppm.

In a further aspect, the anti-drip agents may also be present. Exemplary anti-drip agents can include a fibril forming or non-fibril forming fluoropolymer such as polytetrafluoroethylene (PTFE). The anti-drip agent can optionally be encapsulated by a rigid copolymer, for example styrene-acrylonitrile (SAN). PTFE encapsulated in SAN is known as TSAN. Encapsulated fluoropolymers may be made by polymerizing the encapsulating polymer in the presence of the fluoropolymer, for example, in an aqueous dispersion. TSAN may provide significant advantages over PTFE, in that TSAN may be more readily dispersed in the composition. A suitable TSAN may comprise, for example, about 50 wt % PTFE and about 50 wt % SAN, based on the total weight of the encapsulated fluoropolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer.

Methods of Manufacture

In one aspect, the invention pertains to methods for the manufacture of a polycarbonate blend composition, comprising the steps of: a) providing a virgin polycarbonate component; b) providing a virgin impact modifier component; c) providing a virgin flow promoter component; d) providing a recycled polycarbonate blend composition comprising: i) a recycled polycarbonate component, wherein the recycled polycarbonate component is essentially the same as the virgin polycarbonate prior to recycling; ii) a recycled impact modifier component, wherein the recycled impact modifier component is essentially the same as the virgin impact modifier component prior to recycling; and iii) a recycled flow promoter component, wherein the recycled flow promoter component is essentially the same as the virgin flow promoter component prior to recycling; and forming a polycarbonate blend composition by combining the virgin polycarbonate component, the virgin impact modifier component, the virgin flow promoter component, and the recycled polycarbonate blend composition.

In various further aspects, the method further comprises the step of forming a molded part from the formed polycarbonate blend composition, and wherein the molded part exhibits less splay than that of a polycarbonate blend reference composition, comprising the same amount of a reference polycarbonate component, consisting essentially of the virgin polycarbonate component in the absence of the recycled polycarbonate, the same amount of a reference impact modifier component, consisting essentially of the virgin impact modifier in the absence of the recycled impact modifier; and the same amount of a reference flow promoter component, consisting essentially of the virgin flow promoter in the absence of the recycled flow promoter.

In various further aspects, the method further comprises providing a mineral filler component prior to the forming step; and wherein the forming step further comprises forming a polycarbonate blend composition by combining the virgin polycarbonate component, the virgin impact modifier component, the virgin flow promoter component, the recycled polycarbonate blend composition, and the mineral filler component.

In various further aspects, the method further comprises the step of forming a molded part from the formed polycarbonate blend composition, and wherein the molded part exhibits less splay than that of a polycarbonate blend reference composition, comprising the same amount of a reference polycarbonate component, consisting essentially of the virgin polycarbonate component in the absence of the recycled polycarbonate, the same amount of a reference impact modifier component, consisting essentially of the virgin impact modifier in the absence of the recycled impact modifier; the same amount of a reference flow promoter component, consisting essentially of the virgin flow promoter in the absence of the recycled flow promoter; and the same amount of the same mineral filler component.

In a further aspect, forming a molded part comprises injection molding. In a still further aspect, forming a molded part comprises extrusion molding. In a still further aspect, forming a molded part comprises profile extrusion molding. In an even further aspect, forming a molded part comprises extrusion molding or profile extrusion molding. In a still further aspect, forming a molded part comprises extrusion molding, profile extrusion molding, or injection molding.

In a further aspect, the molded part exhibits at least 25% less splay than that of the polycarbonate blend reference composition. In a still further aspect, the molded part exhibits at least 40% less splay than that of the polycarbonate blend reference composition.

Articles of Manufacture

The disclosed polycarbonate compositions can be used in the manufacture of various end use articles. The polycarbonate compositions can be formed into useful shaped articles by a variety of means such as; injection molding, extrusion, rotational molding, compression molding, blow molding, sheet or film extrusion, profile extrusion, gas assist molding, structural foam molding and thermoforming. The blended polycarbonate compositions described herein resins can also be made into film and sheet as well as components of laminate systems.

Formed articles include, for example, computer and business machine housings, home appliances, trays, plates, handles, helmets, automotive parts such as instrument panels, cup holders, glove boxes, interior coverings and the like. In various further aspects, formed articles include, but are not limited to, food service items, medical devices, animal cages, electrical connectors, enclosures for electrical equipment, electric motor parts, power distribution equipment, communication equipment, computers and the like, including devices that have molded in snap fit connectors. In a further aspect, articles of the present invention comprise exterior body panels and parts for outdoor vehicles and devices including automobiles, protected graphics such as signs, outdoor enclosures such as telecommunication and electrical connection boxes, and construction applications such as roof sections, wall panels and glazing. Multilayer articles made of the disclosed polycarbonates particularly include articles which will be exposed to UV-light, whether natural or artificial, during their lifetimes, and most particularly outdoor articles; i.e., those intended for outdoor use. Suitable articles are exemplified by enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; facsimile machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications.

In one aspect, the present invention pertains to articles comprising the disclosed blended polycarbonate compositions. In a further aspect, the article comprising the disclosed blended polycarbonate compositions is used in automotive applications. In a still further aspect, the article used in automotive applications is selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, and running boards. In a yet further aspect, the article used in automotive applications is selected from seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers. In an even further aspect, the article used in automotive applications is selected from seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers. In an even further aspect, article is selected from instrument panels, overhead consoles, interior trim, center consoles, panels, quarter panels, rocker panels, trim, fenders, doors, deck lids, trunk lids, hoods, bonnets, roofs, bumpers, fascia, grilles, minor housings, pillar appliqués, cladding, body side moldings, wheel covers, hubcaps, door handles, spoilers, window frames, headlamp bezels, headlamps, tail lamps, tail lamp housings, tail lamp bezels, license plate enclosures, roof racks, running boards, seats, seat backs, cargo floors, door panels, steering wheels, radio speaker grilles, instrument panel bezels, steering columns, drip rails, energy absorbers, kick panels, mirror housings, grille opening reinforcements, steps, hatch covers, knobs, buttons, and levers.

In various aspects, the invention relates to articles comprising a disclosed composition. In a further aspect, the article is used in electrical and electronic applications. In a still further aspect, the article is selected from components for cell phones and cell phone covers, components for batteries, components for computer housings, computer housings and business machine housings such as housings for monitors, handheld electronic device housings such as housings for cell phones, electrical connectors, and components of lighting fixtures, ornaments, home appliances, roofs, greenhouses, sun rooms, swimming pool enclosures, Light Emitting Diodes (LEDs) and light panels, extruded film and sheet articles, and the like. In a yet further aspect, the compositions are of particular utility in the manufacture of thin walled articles such as housings for electronic devices. In a still further aspect, additional examples of articles that can be formed from the compositions include electrical parts, such as relays, batteries, capacitors, and enclosures, consumer electronics such as enclosures and parts for laptops, desktops, docking stations, PDAs, digital cameras, desktops, and telecommunications parts such as parts for base station terminals.

Methods of Manufacture

The disclosed polycarbonate compositions of the present invention can be manufactured by various methods. The compositions of the present invention can be blended with the aforementioned ingredients by a variety of methods involving intimate admixing of the materials with any additional additives desired in the formulation. Because of the availability of melt blending equipment in commercial polymer processing facilities, melt processing methods can be used. In various further aspects, the equipment used in such melt processing methods includes, but is not limited to, the following: co-rotating and counter-rotating extruders, single screw extruders, co-kneaders, disc-pack processors and various other types of extrusion equipment. In a further aspect, the extruder is a twin-screw extruder. In various further aspects, the melt processed composition exits processing equipment such as an extruder through small exit holes in a die. The resulting strands of molten resin are cooled by passing the strands through a water bath. The cooled strands can be chopped into small pellets for packaging and further handling.

The temperature of the melt is minimized in order to avoid excessive degradation of the resins. For example, it can be desirable to maintain the melt temperature between about 230° C. and about 350° C. in the molten resin composition, although higher temperatures can be used provided that the residence time of the resin in the processing equipment is kept short. In a still further aspect, the extruder is typically operated at a temperature of about 180° C. to about 385° C. In a yet further aspect, the extruder is typically operated at a temperature of about 200° C. to about 330° C. In an even further aspect, the extruder is typically operated at a temperature of about 220° C. to about 300° C.

In various aspects, the polycarbonate compositions of the present invention can be prepared by blending the first polycarbonate polymer, the second polycarbonate polymer, the impact modifier, the flow promoter, the flame retardant, and any polymer composition additive, e.g. a HENSCHEL-Mixer® high speed mixer or other suitable mixer/blender. Other low shear processes, including but not limited to hand mixing, can also accomplish this blending. The mixture can then be fed into the throat of a single or twin screw extruder via a hopper. Alternatively, at least one of the components can be incorporated into the composition by feeding directly into the extruder at the throat and/or downstream through a side-stuffer. Additives can also be compounded into a masterbatch desired polymeric resin and fed into the extruder. The extruder generally operated at a temperature higher than that necessary to cause the composition to flow. The extrudate is immediately quenched in a water bath and pelletized. The pellets, so prepared, when cutting the extrudate can be one-fourth inch long or less as desired. Such pellets can be used for subsequent molding, shaping, or forming.

In still further aspects, it should be understood that the reclaimed materials utilized to prepare the disclosed compositions, including for example, reclaimed polycarbonate, reclaimed impact modifier, and reclaimed flow promoter, can each be obtained individually and incorporated into the polycarbonate blend composition as a separate source component. Alternatively, any two or more such reclaimed component materials can be obtained from a single source, including for example, a reclaimed impact modified polycarbonate compostion the manufacture of which incorporated virgin polycarbonate, virgin impact modifier, and virgin flow promoter. According to this aspect, it should be understood that the reclaimed materials to be incorporated in the disclosed polycarbonate blend can all be present within a single recycle stream and blended with the remaining components as single source material.

In various aspects, the present invention pertains to and includes at least the following aspects.

Aspect 1: A polycarbonate blend composition, comprising: a) a polycarbonate blend comprising: i) a first polycarbonate component, wherein the first polycarbonate component comprises a virgin polycarbonate; and ii) a second polycarbonate component, wherein the second polycarbonate component comprises a recycled polycarbonate, and wherein the recycled polycarbonate is essentially the same as the virgin polycarbonate prior to recycling; b) an impact modifier blend comprising: i) a first impact modifier component, wherein the first impact modifier component comprises a virgin impact modifier; and ii) a second impact modifier component, wherein the second impact modifier component comprises a recycled impact modifier, and wherein the recycled impact modifier is essentially the same as the virgin impact modifier prior to recycling; wherein a molded part formed from the composition, exhibits less splay than that of a polycarbonate blend reference composition, comprising the same amount of a reference polycarbonate component, consisting essentially of the virgin polycarbonate component in the absence of the recycled polycarbonate, the same amount of a reference impact modifier component, consisting essentially of the virgin impact modifier in the absence of the recycled impact modifier.

Aspect 2: The polycarbonate blend composition of aspect 1, further comprising c) a flow promoter blend comprising: i) a first flow promoter component, wherein the flow promoter component comprises a virgin flow promoter; and ii) a second flow promoter component, wherein the second flow promoter component comprises a recycled flow promoter, and wherein the recycled flow promoter is essentially the same as the virgin flow promoter prior to recycling.

Aspect 3: The polycarbonate blend composition of aspect 2, wherein the first flow promoter component comprises a flow promoter selected from a styrene acrylonitrile (SAN) flow promoter and a poly(methyl methacrylate) (PMMA) flow promoter, or combinations thereof.

Aspect 4: The polycarbonate blend composition of aspects 2 or 3, wherein the flow promoter blend is present in an amount from about 2 wt % to about 18 wt %.

Aspect 5: The polycarbonate blend composition of any of aspects 1-4, further comprising a mineral filler component.

Aspect 6: The polycarbonate blend composition of aspect 5, wherein the mineral filler component comprises talc.

Aspect 7: The polycarbonate blend composition of aspects 5 or 6, wherein the mineral filler component is present in an amount from about 5 wt % to about 25 wt %.

Aspect 8: The polycarbonate blend composition of aspects 5 or 6, wherein the mineral filler component is present in the amount of about 15 wt % of the polymer blend composition.

Aspect 9: The polycarbonate blend composition of any of aspects 1-8, wherein the first polycarbonate component comprises a homopolymer polycarbonate of bisphenol A.

Aspect 10: The polycarbonate blend composition of any of aspects 1-9, wherein the first polycarbonate component comprises a blend of at least two virgin polycarbonates.

Aspect 11: The polycarbonate blend composition of any of aspects 1-10, wherein the polycarbonate blend comprising the first and second polycarbonate components is present in an amount from about 60 wt % to about 75 wt % of the polycarbonate blend composition.

Aspect 12: The polycarbonate blend composition of any of aspects 1-12, wherein the first impact modifier component comprises one more of an acrylonitrile butadiene styrene ("ABS"), a methacrylate butadiene styrene ("MBS"), and a bulk polymerized ABS ("BABS").

Aspect 13: The polycarbonate blend composition of any of aspects 1-12, wherein the impact modifier blend is present in an amount from about 2 wt % to about 18 wt %.

Aspect 14: The polycarbonate blend composition of any of aspects 1-13, wherein the first polycarbonate component has a weight average molecular weight of from about 20,000 g/mol to about 100,000 g/mol on an absolute PC molecular weight scale.

Aspect 15: The polycarbonate blend composition of any of aspects 1-13, wherein the first polycarbonate component has a weight average molecular weight of from about 22,000 g/mol to about 50,000 g/mol on an absolute PC molecular weight scale.

Aspect 16: The polycarbonate blend composition of any of aspects 1-15, wherein a molded part formed from the polycarbonate blend composition, exhibits at least 25% less splay than that of the polycarbonate blend reference composition.

Aspect 17: The polycarbonate blend composition of any of aspects 1-17, wherein the polycarbonate blend composition exhibits a melt volume rate (MVR) no more than about 20% different than that of the polycarbonate blend reference composition when measured in accordance ASTM D 1238 at 260° C. under 5 kg load and a 360 second dwell time.

Aspect 18: The polycarbonate blend composition of any of aspects 1-17, wherein the polycarbonate blend composition exhibits a notched Izod impact strength no more than about 20% less than that of the polycarbonate blend reference composition when measured at 23° C. in accordance with ISO 180.

Aspect 19: The polycarbonate blend composition of any of aspects 1-18, wherein the second polycarbonate component comprises a recycled polycarbonate derived from post-industrial recycled (PIR) polycarbonate.

Aspect 20: The polycarbonate blend composition of any of aspects 1-20, wherein the second polycarbonate component comprises a recycled polycarbonate derived from post-consumer recycled (PCR) polycarbonate.

Aspect 21: The polycarbonate blend composition of aspects 19 or 20, wherein the recycled polycarbonate comprises: a) less than about 100 pm arsenic, and wherein the arsenic can be present as elemental arsenic, one or more arsenic compounds, or a combination thereof; b) less than about 10 ppm mercury, and wherein the mercury can be present as elemental mercury, one or more mercury compounds, or a combination thereof; c) less than about 10 ppm lead, and wherein the lead can be present as elemental lead, one or more mercury compounds, or a combination thereof; d) less than about 10 ppm cadmium, and wherein the cadmium can be present as elemental cadmium, one or more cadmium compounds, or a combination thereof; e) less than about 10 ppm of a lanthanide, and wherein the lanthanide can be present in the elemental form, one or more lanthanide compounds, or a combination thereof; or f) less than about 10 ppm of an actinide, and wherein the actinide can be present in the elemental form, one or more actinide compounds, or a combination thereof.

Aspect 22: The polycarbonate blend composition of any of aspects 19-21, wherein the recycled polycarbonate comprises less than about 1000 ppm of a bromine containing compound; and wherein the recycled polycarbonate comprises less than about 1000 ppm of a chlorine containing compound.

Aspect 23: A method for the manufacture of a polycarbonate blend composition, comprising the steps of: a) providing a virgin polycarbonate component; b) providing a virgin impact modifier component; c) providing a virgin flow promoter component; d) providing a recycled polycarbonate blend composition comprising: i) a recycled polycarbonate component, wherein the recycled polycarbonate component is essentially the same as the virgin polycarbonate prior to recycling; ii) a recycled impact modifier component, wherein the recycled impact modifier component is essentially the same as the virgin impact modifier component prior to recycling; and iii) a recycled flow promoter component, wherein the recycled flow promoter component is essentially the same as the virgin flow promoter component prior to recycling; and e) forming a polycarbonate blend composition by combining the virgin polycarbonate component, the virgin impact modifier component, the virgin flow promoter component, and the recycled polycarbonate blend composition.

Aspect 24: The method of aspect 23, wherein the virgin polycarbonate component comprises a blend of at least two virgin polycarbonates.

Aspect 25: The method of aspects 23 or 23, wherein the virgin polycarbonate component comprises a homopolymer polycarbonate of bisphenol A.

Aspect 26: The method of any of aspects 23-25, wherein the virgin impact modifier component comprises an acrylonitrile butadiene styrene (ABS) impact modifier.

Aspect 27: The method of any of aspects 23-26, wherein the virgin impact modifier component comprises a methyl methacrylate butadiene styrene (MBS) impact modifier.

Aspect 28: The method of any of aspects 23-27, wherein the virgin flow promoter component comprises a styrene acrylonitrile (SAN) flow promoter.

Aspect 29: The method of any of aspects 23-28, wherein the virgin flow promoter component comprises a poly(methyl methacrylate) (PMMA) flow promoter.

Aspect 30: The method of any of aspects 23-29, wherein the recycled polycarbonate blend composition is a post-industrial recycled (PIR) polycarbonate blend composition.

Aspect 31: The method of any of aspects 23-29, wherein the recycled polycarbonate blend composition is a post-consumer recycled (PCR) polycarbonate blend composition.

Aspect 32: The method of any of aspects 23-31, further comprising providing a mineral filler component prior to the forming step; and wherein the forming step further comprises forming a polycarbonate blend composition by combining the virgin polycarbonate component, the virgin impact modifier component, the virgin flow promoter component, the recycled polycarbonate blend composition, and the mineral filler component.

Aspect 33: The method of aspect 32, wherein the mineral filler component comprises talc.

Aspect 34: The method of aspects 32 or 33, further comprising the step of forming a molded part from the formed polycarbonate blend composition, and wherein the molded part exhibits less splay than that of a polycarbonate blend reference composition, comprising the same amount of a reference polycarbonate component, consisting essentially of the virgin polycarbonate component in the absence of the recycled polycarbonate, the same amount of a reference impact modifier component, consisting essentially of the virgin impact modifier in the absence of the recycled impact modifier; the same amount of a reference flow promoter component, consisting essentially of the virgin flow promoter in the absence of the recycled flow promoter; and the same amount of the same mineral filler component.

Aspect 35: The method of any of aspects 23-31, further comprising the step of forming a molded part from the formed polycarbonate blend composition, and wherein the molded part exhibits less splay than that of a polycarbonate blend reference composition, comprising the same amount of a reference polycarbonate component, consisting essentially of the virgin polycarbonate component in the absence of the recycled polycarbonate, the same amount of a reference impact modifier component, consisting essentially of the virgin impact modifier in the absence of the recycled impact modifier; and the same amount of a reference flow promoter component, consisting essentially of the virgin flow promoter in the absence of the recycled flow promoter.

Aspect 36: The method of aspect 35, wherein forming a molded part comprises injection molding.

Aspect 37: The method of aspect 35, wherein forming a molded part comprises extrusion molding or profile extrusion process.

Aspect 38: The method of any of aspects 35-37, wherein the molded part exhibits at least 25% less splay than that of the polycarbonate blend reference composition.

Aspect 39: A polycarbonate blend composition, comprising: a) a polycarbonate blend comprising: i) a first polycarbonate component, wherein the first polycarbonate component comprises a virgin polycarbonate; and ii) a second polycarbonate component, wherein the second polycarbonate component comprises a recycled polycarbonate, and wherein the recycled polycarbonate is essentially the same as the virgin polycarbonate prior to recycling; b) an impact modifier blend comprising: i) a first impact modifier component, wherein the first impact modifier component comprises a virgin impact modifier; and ii) a second impact modifier component, wherein the second impact modifier component comprises a recycled impact modifier, and wherein the recycled impact modifier is essentially the same as the virgin impact modifier prior to recycling; and c) a flow promoter blend comprising: i) a first flow promoter component, wherein the flow promoter component comprises a virgin flow promoter; and ii) a second flow promoter component, wherein the second flow promoter component comprises a recycled flow promoter, and wherein the recycled flow promoter is essentially the same as the virgin flow promoter prior to recycling; wherein a molded part formed from the composition, exhibits less splay than that of a polycarbonate blend reference composition, comprising the same amount of a reference polycarbonate component, consisting essentially of the virgin polycarbonate component in the absence of the recycled polycarbonate, the same amount of a reference impact modifier component, consisting essentially of the virgin impact modifier in the absence of the recycled impact modifier; and the same amount of a reference flow promoter component, consisting essentially of the virgin flow promoter in the absence of the recycled flow promoter.

Aspect 40: A polycarbonate blend composition, comprising: a) a polycarbonate blend comprising: i) a first polycarbonate component, wherein the first polycarbonate component comprises a virgin polycarbonate; and ii) a second polycarbonate component, wherein the second polycarbonate component comprises a recycled polycarbonate, and wherein the recycled polycarbonate is essentially the same as the virgin polycarbonate prior to recycling; b) an impact modifier blend comprising: i) a first impact modifier component, wherein the first impact modifier component comprises a virgin impact modifier; and ii) a second impact modifier component, wherein the second impact modifier component comprises a recycled impact modifier, and wherein the recycled impact modifier is essentially the same as the virgin impact modifier prior to recycling; c) a flow promoter blend comprising: i) a first flow promoter component, wherein the flow promoter component comprises a virgin flow promoter; and ii) a second flow promoter component, wherein the second flow promoter component comprises a recycled flow promoter, and wherein the recycled flow promoter is essentially the same as the virgin flow promoter prior to recycling;

and d) a mineral filler component; wherein a molded part formed from the composition, exhibits less splay than that of a polycarbonate blend reference composition, comprising the same amount of a reference polycarbonate component, consisting essentially of the virgin polycarbonate component in the absence of the recycled polycarbonate, the same amount of a reference impact modifier component, consisting essentially of the virgin impact modifier in the absence of the recycled impact modifier; the same amount of a reference flow promoter component, consisting essentially of the virgin flow promoter in the absence of the recycled flow promoter; and the same amount of the same mineral filler component.

Aspect 41: A polycarbonate blend composition, comprising: a) a polycarbonate blend comprising: i) a first polycarbonate component, wherein the first polycarbonate component comprises a virgin polycarbonate; and ii) a second polycarbonate component, wherein the second polycarbonate component comprises a recycled polycarbonate, and wherein the recycled polycarbonate is essentially the same as the virgin polycarbonate prior to recycling; b) an impact modifier blend comprising: i) a first impact modifier component, wherein the first impact modifier component comprises a virgin impact modifier; and ii) a second impact modifier component, wherein the second impact modifier component comprises a recycled impact modifier, and wherein the recycled impact modifier is essentially the same as the virgin impact modifier prior to recycling; b) a flow promoter blend comprising: i) a first flow promoter component, wherein the flow promoter component comprises a virgin flow promoter; and ii) a second flow promoter component, wherein the second flow promoter component comprises a recycled flow promoter, and wherein the recycled flow promoter is essentially the same as the virgin flow promoter prior to recycling; and c) a mineral filler component; wherein the composition exhibits a melt volume rate (MVR) no more than about 20% different than that of the polycarbonate blend reference composition, as measured using ASTM D 1238 at 260° C. under 5 kg load and a 360 second dwell time; wherein the composition exhibits a notched Izod impact strength no more than about 20% less than that of the polycarbonate blend reference composition, as measured at 23° C. according to ISO 180; and wherein a molded part formed from the composition, exhibits at least about 25% less splay than that of a polycarbonate blend reference composition, comprising the same amount of a reference polycarbonate component, consisting essentially of the virgin polycarbonate component in the absence of the recycled polycarbonate, the same amount of a reference impact modifier component, consisting essentially of the virgin impact modifier in the absence of the recycled impact modifier; the same amount of a reference flow promoter component, consisting essentially of the virgin flow promoter in the absence of the recycled flow promoter; and the same amount of the same mineral filler component.

Aspect 42: A polycarbonate blend composition, comprising: a) a virgin polycarbonate component; b) a virgin impact modifier component; c) a virgin flow promoter component; d) a recycled polycarbonate blend composition comprising: i) a recycled polycarbonate component; ii) a recycled impact modifier component; and iii) a recycled flow promoter component; wherein a molded part formed from the composition exhibits less splay than that of a polycarbonate blend reference composition, wherein the polycarbonate blend reference composition comprises: a) a reference polycarbonate component consisting essentially of same amount the virgin polycarbonate component and a recycled reference polycarbonate component in an amount essentially the same as the recycled polycarbonate component, wherein the recycled reference polycarbonate component is a virgin polycarbonate essentially the same as the polycarbonate present in the recycled polycarbonate blend composition prior to recycling; b) a reference impact modifier component consisting essentially of same amount the virgin impact modifier component and a recycled reference impact modifier component in an amount essentially the same as the recycled impact modifier component, wherein the recycled reference impact modifier component is a virgin impact modifier essentially the same as the impact modifier present in the recycled polycarbonate blend composition prior to recycling; and c) a reference flow promoter component consisting essentially of same amount the virgin flow promoter component and a recycled reference flow promoter component in an amount essentially the same as the recycled flow promoter component, wherein the recycled reference flow promoter component is a virgin flow promoter essentially the same as the flow promoter present in the recycled polycarbonate blend composition prior to recycling.

Aspect 43: The polycarbonate blend composition of aspect 42, further comprising a mineral filler component.

Aspect 44: The polycarbonate blend composition of aspect 43, wherein the mineral filler component comprises talc.

Aspect 45: The polycarbonate blend composition of aspects 43 or 44, wherein the mineral filler component is present in an amount from about 5 wt % to about 25 wt %.

Aspect 46: The polycarbonate blend composition of aspects 43 or 44, wherein the mineral filler component is present in the amount of about 15 wt % of the polymer blend composition.

Aspect 47: The polycarbonate blend composition of any of aspects 42-46, wherein the virgin polycarbonate component is present in an amount from about 60 wt % to about 75 wt %.

Aspect 48: The polycarbonate blend composition of any of aspects 42-47, wherein the virgin polycarbonate component comprises a homopolymer polycarbonate of bisphenol A.

Aspect 49: The polycarbonate blend composition of any of aspects 42-48, wherein the virgin polycarbonate component comprises a blend of at least two virgin polycarbonates.

Aspect 50: The polycarbonate blend composition of any of aspects 42-48, wherein the virgin polycarbonate component has a weight average molecular weight of from about 20,000 g/mol to about 100,000 g/mol on an absolute PC molecular weight scale.

Aspect 51: The polycarbonate blend composition of any of aspects 42-48, wherein the virgin polycarbonate component has a weight average molecular weight of from about 22,000 g/mol to about 50,000 g/mol on an absolute PC molecular weight scale.

Aspect 52: The polycarbonate blend composition of any of aspects 42-51, wherein the recycled polycarbonate component is present in an amount from about 15 wt % to about 40 wt %.

Aspect 53: The polycarbonate blend composition of any of aspects 42-52, wherein the recycled polycarbonate component is essentially the same as the virgin polycarbonate prior to recycling.

Aspect 54: The polycarbonate blend composition of any of aspects 42-53, wherein the recycled polycarbonate component comprises a homopolymer polycarbonate of bisphenol A.

Aspect 55: The polycarbonate blend composition of any of aspects 42-54, wherein the recycled polycarbonate component comprises a blend of at least two recycled polycarbonates.

Aspect 56: The polycarbonate blend composition of any of aspects 42-54, wherein the recycled polycarbonate component has a weight average molecular weight of from about 20,000 g/mol to about 100,000 g/mol on an absolute PC molecular weight scale.

Aspect 57: The polycarbonate blend composition of any of aspects 42-54, wherein the recycled polycarbonate component has a weight average molecular weight of from about 22,000 g/mol to about 50,000 g/mol on an absolute PC molecular weight scale.

Aspect 58: The polycarbonate blend composition of any of aspects 42-57, wherein the virgin impact modifier component is present in an amount from about 0.1 wt % to about 5 wt %.

Aspect 59: The polycarbonate blend composition of any of aspects 42-58, wherein the virgin impact modifier comprises one more of an acrylonitrile butadiene styrene ("ABS"), a methacrylate butadiene styrene ("MBS"), and a bulk polymerized ABS ("BABS").

Aspect 60: The polycarbonate blend composition of any of aspects 42-59, wherein the recycled impact modifier component is present in an amount from about 0.1 wt % to about 5 wt %.

Aspect 61: The polycarbonate blend composition of any of aspects 42-60, wherein the recycled impact modifier component is essentially the same as the virgin impact modifier component prior to recycling.

Aspect 62: The polycarbonate blend composition of any of aspects 42-61, wherein the recycled impact modifier comprises one more of an acrylonitrile butadiene styrene ("ABS"), a methacrylate butadiene styrene ("MBS"), and a bulk polymerized ABS ("BABS").

Aspect 63: The polycarbonate blend composition of any of aspects 42-62, wherein the virgin flow promoter component is present in an amount from about 1 wt % to about 5 wt %.

Aspect 64: The polycarbonate blend composition of any of aspects 42-63, wherein the virgin flow promoter comprises a flow promoter selected from a styrene acrylonitrile (SAN) flow promoter and a poly(methyl methacrylate) (PMMA) flow promoter, or combinations thereof.

Aspect 65: The polycarbonate blend composition of any of aspects 42-64, wherein the recycled flow promoter component is present in an amount from about 1 wt % to about 5 wt %.

Aspect 66: The polycarbonate blend composition of any of aspects 42-65, wherein the recycled flow promoter component is essentially the same as the virgin flow promoter component prior to recycling.

Aspect 67: The polycarbonate blend composition of any of aspects 42-66, wherein the recycled flow promoter comprises a flow promoter selected from a styrene acrylonitrile (SAN) flow promoter and a poly(methyl methacrylate) (PMMA) flow promoter, or combinations thereof.

Aspect 68: The polycarbonate blend composition of any of aspects 42-67, wherein the recycled polycarbonate component comprises a recycled polycarbonate derived from post-industrial recycled (PIR) polycarbonate.

Aspect 69: The polycarbonate blend composition of any of aspects 42-67, wherein the recycled polycarbonate component comprises a recycled polycarbonate derived from post-consumer recycled (PCR) polycarbonate.

Aspect 70: The polycarbonate blend composition of aspects 68 or 69, wherein the recycled polycarbonate comprises: a) less than about 100 pm arsenic, and wherein the arsenic can be present as elemental arsenic, one or more arsenic compounds, or a combination thereof; b) less than about 10 ppm mercury, and wherein the mercury can be present as elemental mercury, one or more mercury compounds, or a combination thereof; c) less than about 10 ppm lead, and wherein the lead can be present as elemental lead, one or more mercury compounds, or a combination thereof; d) less than about 10 ppm cadmium, and wherein the cadmium can be present as elemental cadmium, one or more cadmium compounds, or a combination thereof; e) less than about 10 ppm of a lanthanide, and wherein the lanthanide can be present in the elemental form, one or more lanthanide compounds, or a combination thereof; or f) less than about 10 ppm of an actinide, and wherein the actinide can be present in the elemental form, one or more actinide compounds, or a combination thereof.

Aspect 71: The polycarbonate blend composition of aspects 68-70, wherein the recycled polycarbonate comprises less than about 1000 ppm of a bromine containing compound; and wherein the recycled polycarbonate comprises less than about 1000 ppm of a chlorine containing compound.

Aspect 72: The polycarbonate blend composition of any of aspects 42-71, wherein molded part formed from the polycarbonate blend composition exhibits at least about 25% less splay than that of a polycarbonate blend reference composition.

Aspect 73: The polycarbonate blend composition of any of aspects 42-72, wherein the polycarbonate blend composition further exhibits a melt volume rate (MVR) no more than about 20% different than that of the polycarbonate blend reference composition, as measured using ASTM D 1238 at 260° C. under 5 kg load and a 360 second dwell time.

Aspect 74: The polycarbonate blend composition of any of aspects 42-73, wherein the polycarbonate blend composition further exhibits a notched Izod impact strength no more than about 20% less than that of the polycarbonate blend reference composition, as measured at 23° C. according to ISO 180.

Aspect 75: A polycarbonate blend composition, comprising: a) a virgin polycarbonate component; b) a virgin impact modifier component; c) a virgin flow promoter component; d) a mineral filler component; and e) a recycled polycarbonate blend composition comprising: i) a recycled polycarbonate component; ii) a recycled impact modifier component; and iii) a recycled flow promoter component; wherein a molded part formed from the composition exhibits at least about 25% less splay than that of a polycarbonate blend reference composition, wherein the polycarbonate blend reference composition comprises: a) a reference polycarbonate component consisting essentially of same amount the virgin polycarbonate component and a recycled reference polycarbonate component in an amount essentially the same as the recycled polycarbonate component, wherein the recycled reference polycarbonate component is a virgin polycarbonate essentially the same as the polycarbonate present in the recycled polycarbonate blend composition prior to recycling; b) a reference impact modifier component consisting essentially of same amount the virgin impact modifier component and a recycled reference impact modifier component in an amount essentially the same as the recycled impact modifier component, wherein the recycled reference impact modifier component is a virgin impact modifier essentially the same as the impact modifier present in the recycled polycarbonate blend composition prior to recycling; c) a reference flow promoter component consisting essentially of same amount the virgin flow promoter component and a recycled reference flow promoter component in an amount essentially the same as the recycled flow promoter component, wherein the recycled reference flow promoter component is a virgin flow promoter essentially the same as the flow promoter present in the recycled polycarbonate blend composition prior to recycling; and d) essentially the same amount of the mineral filler component.

Without further elaboration, it is believed that one skilled in the art can, using the description herein, utilize the present invention. The following examples are included to provide addition guidance to those skilled in the art of practicing the claimed invention. The examples provided are merely representative of the work and contribute to the teaching of the present invention. Accordingly, these examples are not intended to limit the invention in any manner.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

The materials shown in Table 1 were used to prepare the compositions described and evaluated herein. Sample batches were prepared by pre-blending all constituents in a dry-blend and tumble mixing for 20 minutes. The pre-blend was fed directly to a co-rotating twin screw extruder (30 mm) operated under standard processing conditions well known to one skilled in the art.

TABLE 1

| Abbreviation | Description | Source |
|---|---|---|
| PC1 | BPA polycarbonate resin made by an interfacial process with a weight average molecular weight of about 30,000 on an absolute PC molecular weight scale | SABIC Innovative Plastics ("SABIC-IP") |
| PC2 | High flow BPA polycarbonate made by an interfacial process with weight average molecular weight ($M_w$) of about 22k measured on an absolute PC molecular weight scale. | SABIC IP |
| PIR1 | PC/ABS post-industrial recycle stream with composition as described in Table 2. | SABIC IP |
| PIR2 | PC/ABS post-industrial recycle stream with composition as described in Table 2. | SABIC IP |
| SAN1 | High flow bulk styrene acrylonitrile copolymer comprising 15-35 wt. % acrylonitrile with an Melt Flow of 5.2-7.2 g/10 min at 190° C./2.16 kg | SABIC-IP |
| MBS1 | Methyl methacrylate butadiene styrene impact modifier sold under the trade name Paraloid ™ EXL-2691 A. | Dow Chemical Company |
| ADD1 | Octadecyl 3-(3,5-di-tert-butyl-4 hydroxyphenyl)propionate, a hindered phenol antioxidant sold under the trade name Anox ® PP 18 Powder. | Chemtura Corp. |
| ADD2 | Pentaeryithritol tetrastearate. | Lonza Inc. |
| ADD3 | Pentaerythritol tetrakis B-laurylthiopropionate (CAS 29598-76-3), a pentaerythritol betaalkyl-thioproprionate sold under the trade name SEENOX ® 412S | Rionlon Chemicals |
| ADD4 | Tris(2,4-di-t-butylphenyl) phosphite, an aryl phosphite stabilizer sold under the trade name Alkanox ® 240. | Chemtura Corp. |
| ADD5 | Monozinc phosphate. | Gallard Schlesinger Industries |
| T1 | Fine talc sold under the trade name Jetfine 3CA. | Luzenac America Inc. |
| C1 | Carbon black with color index of Pigment Black 7 (CAS# 1333-86-4), and sold under the trade name Monarch ® 800. | Cabot |

Table 2 illustrates the composition of post-industrial recycle streams as set forth in Table 1 above as PIR1 and PIR2.

TABLE 2

| # | Item | PIR 1 | PIR 2 |
|---|---|---|---|
| 1 | PC1 | 50.5 | 54.9 |
| 2 | PC2 | 23.8 | 25.9 |
| 3 | SAN1 | 12.4 | 12.4 |
| 4 | MBS1 | 12.4 | 6 |
| 5 | ADD1 | 0.2 | 0.25 |
| 6 | ADD2 | 0.2 | 0.25 |
| 7 | ADD3 | 0.2 | 0.25 |
| 8 | ADD4 | 0.1 | 0.1 |
| TOTAL | | 100.0 | 100.0 |

Table 3 shows the composition of the different polycarbonate blend compositions described herein, including a control blend, labeled "CS", and example blends comprising varied amounts of post-industrial recycle content (varied from 15 wt % to 35 wt %). The control blend, CS, is a polycarbonate blend reference composition that does not contain a recycled polycarbonate blend composition. All the formulations in Table 3 comprise 15% jet fine talc from Luzenac (Jetfine 3CA). As shown in Table 3, in order to have the same final composition of the formulations, as the recycle content was varied, the other components of the final polycarbonate blend composition were adjusted accordingly. The blends were prepared by standard methods known to one skilled in the art.

TABLE 3

| No. | Item | CS | 1 | 2 | 3 |
|---|---|---|---|---|---|
| 1 | PC1 | 47.1 | 39.5 | 34.5 | 29.4 |
| 2 | PC2 | 22.5 | 18.9 | 16.5 | 14.1 |
| 3 | PIR1 | 0 | 15.0 | 25.0 | 35.0 |
| 4 | MBS1 | 4.4 | 2.5 | 1.3 | 0.1 |
| 5 | SAN1 | 9.5 | 7.6 | 6.4 | 5.2 |
| 6 | ADD1 | 0.3 | 0.2 | 0.2 | 0.2 |
| 7 | ADD2 | 0.3 | 0.2 | 0.2 | 0.2 |
| 8 | ADD3 | 0.3 | 0.2 | 0.2 | 0.2 |
| 9 | ADD4 | 0.1 | 0.1 | 0.1 | 0.1 |
| 10 | ADD5 | 0.2 | 0.2 | 0.2 | 0.2 |
| 11 | T1 | 15.0 | 15.0 | 15.0 | 15.0 |
| 12 | C1 | 0.5 | 0.5 | 0.5 | 0.5 |
| | TOTAL | 84.4 | 100.00 | 100.00 | 100.00 |

Typical flow and physical properties are shown in Table 4 for the polycarbonate blend compositions shown in Table 3. The melt flow rates (MVR), measured by the ASTM D1238 and ISO 1133 protocols, at 260° C. and under a 5 kg load respectively, are tabulated. Increasing the recycled polycarbonate blend composition content from about 0 wt % to about 35 wt % does not result in any deterioration in melt stability of the disclosed polycarbonate blend compositions, as can be seen from the identical values at the standard (360 sec dwell) and abusive (1080 sec dwell) measurement conditions. The time sweep of melt viscosity over 1800 sec did not show a significant drop, indicating melt stability under shear and temperature. Notched Izod impact, as measured by ISO 180, multi-axial impact using the ASTM D3763, and stiffness characteristics of these blends, as measured by uniaxial tensile testing following ISO 527 protocol, remain comparable. Thus, increasing recycled polycarbonate blend composition content from about 0 wt % to about 35 wt %, results in maintaining all the key properties.

These results, are a surprising deviation for what is typically expected, namely one would expect a significant deterioration of physical properties with incorporation of recycle streams at high levels (>35%). Without wishing to be bound by a particular theory, it is hypothesized that such deterioration can be prevented through strict control of the recycle stream going back into the product. This is a significant advantage from a manufacturing and operations standpoint, as a significant incorporation of recycled polycarbonate blend streams could be made, thus, reducing the costs, as well as allowing "eco-friendly" use of plastics.

TABLE 4

| No. | Test Method | Test Description | Unit | Sample CS | 1 | 2 | 3 |
|---|---|---|---|---|---|---|---|
| 1 | MVR - ASTM D 1238 | 260 C./5 kg/ 360 s | cm³/10 min | 10 | 10 | 9 | 9 |
| | | 260 C./5 kg/ 1080 s | Cm³/10 min | 10 | 10 | 9 | 9 |
| 2 | MVR - ISO1133 | 260 C./5 kg/ 300 s | cm³/10 min | 10 | 10 | 9 | 9 |
| 3 | Melt State Rheology | Viscosity change, 260 C./(total time = 1800 s) | % | −13 | −4.6 | −6 | −6.9 |
| 4 | ISO 180 INI. 23° C./5.5 J | Ductility | % | 100 | 100 | 100 | 100 |
| | | Impact Strength | kJ/m² | 20 | 15 | 14 | 16 |
| 5 | ISO 180 INI. 0° C./5.5 J | Ductility | % | 90 | 100 | 100 | 100 |
| | | Impact Strength | kJ/m² | 11 | 9 | 8 | 8 |
| 6 | MAI - ASTM D3763 | 23 C./3.2 mm/2.3 m/s | | | | | |
| | | Ductility | % | 100 | 100 | 100 | 100 |
| | | Energy to max load - Avg | J | 52.2 | 49.2 | 48.3 | 51.4 |
| | | Energy to failure - Avg | J | 56.1 | 55.2 | 53.5 | 56.3 |
| | | Energy, Total - Avg | J | 56.1 | 55.4 | 54.6 | 56.4 |
| 7 | Uniaxial Tensile ISO527 | 5 mm/min/ 23 C. | | | | | |
| | | Chord Modulus-Avg | MPa | 4300 | 4256 | 4211 | 4021 |
| | | Stress at Yield-Avg | MPa | 56 | 58 | 58 | 57 |
| | | Stress at Break-Avg | MPa | 47 | 23 | 31 | 41 |
| | | Strain at Yield-Avg | % | 4 | 4 | 4 | 4 |
| | | Strain at Break-Avg | % | 50 | 62 | 58 | 72 |
| 8 | Center-gated disks | Appearance | | See FIGS. 1 and 2. | | | |

Molded parts were formed from the polycarbonate blend compositions described herein above and as shown in Table 3. FIG. 1 shows representative examples of center-gated disks of the same dimensions, molded using exactly the same abusive conditions (525° F. melt temperature, 6.6. in/s injection speed), with the four samples containing about 0 wt % to about 35 wt % of the recycled polycarbonate blend composition. It can be seen clearly that the extent of splay from the center gate diminishes progressively, as about 15 wt % and about 25 wt % of recycled polycarbonate blend composition is provided to the final polycarbonate blend composition, compared to the polycarbonate blend reference composition containing 0 wt % recycled polycarbonate blend compostion, labeled as "CS". These results are quite surprising, as all the four samples have the exact same composition, and yet they show a trend in surface aesthetics, suggesting that providing recycled polycarbonate blend composition to the manufacture polycarbonate blend compositions can be beneficial in controlling and reducing surface defects. Table 5 shows the splay data, i.e. the percentage of total disk area showing splay, for the images shown in FIG. 1. The table also shows these data normalized to the control sample, i.e. the control sample ("CS") is set to an index value of 100 for splay and the samples comprising varying levels of PIR1 (recycled polycarbonate blend composition) are proportional to control sample. Thus, a lower index value for the example compositions indicates a decreased level of splay. The data in Table 5 indicate that there exists a recycle loading (25% for this set of samples) at which the splay is minimized implying a non-monotonic trend in the extent of splay vs. the recycle loading.

TABLE 5

| Sample | % splay | Indexed Splay |
| --- | --- | --- |
| CS: 0 wt % Recycle (PIR1) | 40 | 100.0 |
| 15 wt % Recycle (PIR1) | 30 | 75.0 |
| 25 wt % Recycle (PIR1) | 15 | 37.5 |
| 35 wt % Recycle (PIR1) | 23 | 57.5 |

Table 6 below shows a second set of the different polycarbonate blend compositions described herein. The control sample, labeled CS, is again a polycarbonate blend reference composition that does not contain the recycled polycarbonate blend composition. Various amounts (in weight percent) of a post-industrial recycle (PIR) stream different than that used in the preceding formulations, labeled as PIR2 (see Table 2 for composition), are provided for the manufacture of the inventive polycarbonate blend composition according to the disclosed methods. As shown in Table 6, the formulations comprise 15 wt % talc (Luzenac Jetfine 3CA talc). The content of the post-industrial recycle polycarbonate blend composition in the example blends was varied from about 15 wt % to about 50 wt %. As shown in Table 6, in order to have the same final composition of the formulations, as the recycle content was varied, the other components of the final polycarbonate blend composition were adjusted accordingly. The blends were prepared by standard methods known to one skilled in the art.

TABLE 6

| # | Item | CS | 4 | 5 | 6 | 7 |
| --- | --- | --- | --- | --- | --- | --- |
| 1 | PC1 | 47.1 | 38.8 | 33.2 | 21.1 | 19.3 |
| 2 | PC2 | 22.5 | 18.5 | 15.9 | 13.3 | 9.4 |
| 3 | PIR2 | 0 | 15.0 | 25.0 | 35.0 | 50.0 |
| 4 | MBS1 | 4.4 | 3.5 | 2.9 | 2.3 | 1.4 |
| 5 | SAN1 | 9.5 | 7.64 | 6.4 | 5.16 | 3.3 |
| 6 | ADD1 | 0.3 | 0.2 | 0.2 | 0.2 | 0.2 |
| 7 | ADD2 | 0.3 | 0.2 | 0.2 | 0.2 | 0.2 |
| 8 | ADD3 | 0.3 | 0.2 | 0.2 | 0.2 | 0.2 |
| 9 | ADD4 | 0.1 | 0.1 | 0.1 | 0.1 | 0.1 |
| 10 | ADD5 | 0.2 | 0.2 | 0.2 | 0.2 | 0.2 |
| 11 | T1 | 15.0 | 15.0 | 15.0 | 15.0 | 15.0 |
| 12 | C1 | 0.5 | 0.5 | 0.5 | 0.5 | 0.5 |
| | TOTAL | 84.4 | 100.00 | 100.00 | 100.00 | 100.00 |

Molded parts were formed from the polycarbonate blend compositions of described in Table 6. Center-gated disks of the same dimensions were molded using exactly the same abusive conditions (525° F. melt temperature, 6.6. in/s injection speed), with the four samples containing 0 wt % to 50 wt % of the recycled polycarbonate blend composition. The disks were analyzed for splay and the data normalized to the control formulation in the same manner as described for Table 5. The normalized splay data are shown in Table 7 for the formulations described in Table 6. The data show that the extent of splay from the center gate is comparable to the control sample at 15 wt % and 25 wt % of recycled polycarbonate blend composition (PIR2), and that at 35 wt % of recycled polycarbonate blend (PIR2) there was a significant and surprising decrease in splay in the center disk sample. The formulation comprising 50 wt % of the recycled polycarbonate blend composition appears to have a somewhat increased splay. Nevertheless, even at 50% loading of the recycle stream PIR 2, the splay remains at levels comparable to that of the reference example. These examples demonstrate that the inventive polycarbonate blend compositions containing the recycled polycarbonate blend compositions have significantly improved surface aesthetics.

TABLE 7

| Sample | Indexed Splay |
| --- | --- |
| CS: 0 wt % Recycle (PIR1) | 100.0 |
| 15 wt % Recycle (PIR1) | 111.3 |
| 25 wt % Recycle (PIR1) | 123.5 |
| 35 wt % Recycle (PIR1) | 23.5 |
| 50 wt % Recycle (PIR1) | 169.0 |

These data suggest that there is an optimum recycle level at which splay is minimized, which is consistent with the results obtained with the previous set of examples (see Table 3 for formulations 1-3). For example, the set of examples comprising PIR2, the optimum loading of recycled polycarbonate blend is at 35 wt % as opposed to the optimum loading of 25 wt % for the formulations comprising PIR1. Without wishing to be bound by a particular theory, the data suggest that splay can be fine-tuned by choice of post-industrial recycle stream with specific compositional characteristics and/or the loading (wt % in formulation) of the recycled polycarbonate blend.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A polycarbonate blend composition, comprising:
  a. a polycarbonate blend comprising:
     i) a first polycarbonate component, wherein the first polycarbonate component comprises a virgin polycarbonate and a mineral filler; and
     ii) a second polycarbonate component, wherein the second polycarbonate component comprises a recycled polycarbonate, and wherein the recycled polycarbonate is essentially the same as the virgin polycarbonate prior to recycling;
  b. an impact modifier blend comprising:
     i) a first impact modifier component, wherein the first impact modifier component comprises a virgin impact modifier; and ii) a second impact modifier component, wherein the second impact modifier component comprises a recycled impact modifier, and wherein the recycled impact modifier is essentially the same as the virgin impact modifier prior to recycling;

wherein the recycled polycarbonate is present in an amount of up to 30 wt. % of the polycarbonate blend composition; and wherein the composition does not include a fire retardant and a molded part formed from the composition, exhibits less splay than that of a polycarbonate blend reference composition, comprising the same amount of a reference polycarbonate component, consisting essentially of the virgin polycarbonate component in the absence of the recycled polycarbonate, the same amount of a reference impact modifier component, consisting essentially of the virgin impact modifier in the absence of the recycled impact modifier.

2. The polycarbonate blend composition of claim 1, further comprising
c. a flow promoter blend comprising:
  i) a first flow promoter component, wherein the flow promoter component comprises a virgin flow promoter; and
  ii) a second flow promoter component, wherein the second flow promoter component comprises a recycled flow promoter, and wherein the recycled flow promoter is essentially the same as the virgin flow promoter prior to recycling.

3. The polycarbonate blend composition of claim 2, wherein the first flow promoter component comprises a flow promoter selected from a styrene acrylonitrile (SAN) flow promoter and a poly(methyl methacrylate) (PMMA) flow promoter, or combinations thereof.

4. The polycarbonate blend composition of claim 2, wherein the flow promoter blend is present in an amount from about 2 wt % to about 18 wt %.

5. The polycarbonate blend composition of claim 1, wherein the mineral filler component comprises talc.

6. The polycarbonate blend composition of claim 1, wherein the mineral filler component is present in an amount from about 5 wt % to about 25 wt %.

7. The polycarbonate blend composition of claim 1, wherein the mineral filler component is present in the amount of about 15 wt % of the polymer blend composition.

8. The polycarbonate blend composition of claim 1, wherein the first polycarbonate component comprises a homopolymer polycarbonate of bisphenol A.

9. The polycarbonate blend composition of claim 1, wherein the first polycarbonate component comprises a blend of at least two virgin polycarbonates.

10. The polycarbonate blend composition of claim 1, wherein the polycarbonate blend comprising the first and second polycarbonate components is present in an amount from about 60 wt % to about 75 wt % of the polycarbonate blend composition.

11. The polycarbonate blend composition of claim 1, wherein the first impact modifier component comprises one more of an acrylonitrile butadiene styrene ("ABS"), a methacrylate butadiene styrene ("MBS"), and a bulk polymerized ABS ("BABS").

12. The polycarbonate blend composition of claim 1, wherein the impact modifier blend is present in an amount from about 2 wt % to about 18 wt %.

13. The polycarbonate blend composition of claim 1, wherein the first polycarbonate component has a weight average molecular weight of from about 20,000 g/mol to about 100,000 g/mol on an absolute PC molecular weight scale.

14. The polycarbonate blend composition of claim 1, wherein the first polycarbonate component has a weight average molecular weight of from about 22,000 g/mol to about 50,000 g/mol on an absolute PC molecular weight scale.

15. The polycarbonate blend composition of claim 1, wherein a molded part formed from the polycarbonate blend composition, exhibits at least 25% less splay than that of the polycarbonate blend reference composition.

16. The polycarbonate blend composition of claim 1, wherein the polycarbonate blend composition exhibits a melt volume rate (MVR) no more than about 20% different than that of the polycarbonate blend reference composition when measured in accordance ASTM D 1238 at 260° C. under 5 kg load and a 360 second dwell time.

17. The polycarbonate blend composition of claim 1, wherein the polycarbonate blend composition exhibits a notched Izod impact strength no more than about 20% less than that of the polycarbonate blend reference composition when measured at 23° C. in accordance with ISO 180.

18. The polycarbonate blend composition of claim 1, wherein the second polycarbonate component comprises a recycled polycarbonate derived from post-industrial recycled (PIR) polycarbonate.

19. The polycarbonate blend composition of claim 18, wherein the recycled polycarbonate comprises less than about 1000 ppm of a bromine containing compound; and wherein the recycled polycarbonate comprises less than about 1000 ppm of a chlorine containing compound.

20. The polycarbonate blend composition of claim 18, wherein the recycled polycarbonate comprises:
  a. less than about 100 pm arsenic, and wherein the arsenic can be present as elemental arsenic, one or more arsenic compounds, or a combination thereof;
  b. less than about 10 ppm mercury, and wherein the mercury can be present as elemental mercury, one or more mercury compounds, or a combination thereof;
  c. less than about 10 ppm lead, and wherein the lead can be present as elemental lead, one or more mercury compounds, or a combination thereof;
  d. less than about 10 ppm cadmium, and wherein the cadmium can be present as elemental cadmium, one or more cadmium compounds, or a combination thereof;
  e. less than about 10 ppm of a lanthanide, and wherein the lanthanide can be present in the elemental form, one or more lanthanide compounds, or a combination thereof; or
  f. less than about 10 ppm of an actinide, and wherein the actinide can be present in the elemental form, one or more actinide compounds, or a combination thereof.

21. The polycarbonate blend composition of claim 1, wherein the second polycarbonate component comprises a recycled polycarbonate derived from post-consumer recycled (PCR) polycarbonate.

22. The polycarbonate blend composition of claim 21, wherein the recycled polycarbonate comprises:
  a. less than about 100 pm arsenic, and wherein the arsenic can be present as elemental arsenic, one or more arsenic compounds, or a combination thereof;
  b. less than about 10 ppm mercury, and wherein the mercury can be present as elemental mercury, one or more mercury compounds, or a combination thereof;
  c. less than about 10 ppm lead, and wherein the lead can be present as elemental lead, one or more mercury compounds, or a combination thereof;

d. less than about 10 ppm cadmium, and wherein the cadmium can be present as elemental cadmium, one or more cadmium compounds, or a combination thereof;
e. less than about 10 ppm of a lanthanide, and wherein the lanthanide can be present in the elemental form, one or more lanthanide compounds, or a combination thereof; or
f. less than about 10 ppm of an actinide, and wherein the actinide can be present in the elemental form, one or more actinide compounds, or a combination thereof.

23. The polycarbonate blend composition of claim 21, wherein the recycled polycarbonate comprises less than about 1000 ppm of a bromine containing compound; and wherein the recycled polycarbonate comprises less than about 1000 ppm of a chlorine containing compound.

24. A method for the manufacture of a polycarbonate blend composition, comprising the steps of:
    a. providing a virgin polycarbonate component;
    b. providing a virgin impact modifier component;
    c. providing a virgin flow promoter component;
    d. providing a recycled polycarbonate blend composition comprising:
        i) a recycled polycarbonate component, wherein the recycled polycarbonate component is essentially the same as the virgin polycarbonate prior to recycling;
        ii) a recycled impact modifier component, wherein the recycled impact modifier component is essentially the same as the virgin impact modifier component prior to recycling; and
        iii) a recycled flow promoter component, wherein the recycled flow promoter component is essentially the same as the virgin flow promoter component prior to recycling; and
    e. forming a polycarbonate blend composition by combining the virgin polycarbonate component, the virgin impact modifier component, the virgin flow promoter component, and the recycled polycarbonate blend composition wherein the recycled polycarbonate is present in an amount of up to 30 wt. % of the polycarbonate blend composition.

25. The method of claim 24, wherein the virgin polycarbonate component comprises a blend of at least two virgin polycarbonates.

26. The method of claim 24, wherein the virgin polycarbonate component comprises a homopolymer polycarbonate of bisphenol A.

27. The method of claim 24, wherein the virgin impact modifier component comprises an acrylonitrile butadiene styrene (ABS) impact modifier.

28. The method of claim 24, wherein the virgin impact modifier component comprises a methyl methacrylate butadiene styrene (MBS) impact modifier.

29. The method of claim 24, wherein the virgin flow promoter component comprises a styrene acrylonitrile (SAN) flow promoter.

30. The method of claim 24, wherein the virgin flow promoter component comprises a poly (methyl methacrylate) (PMMA) flow promoter.

31. The method of claim 24, wherein the recycled polycarbonate blend composition is a post-industrial recycled (PIR) polycarbonate blend composition.

32. The method of claim 24, wherein the recycled polycarbonate blend composition is a post-consumer recycled (PCR) polycarbonate blend composition.

33. The method of claim 24, further comprising providing a mineral filler component prior to the forming step; and wherein the forming step further comprises forming a polycarbonate blend composition by combining the virgin polycarbonate component, the virgin impact modifier component, the virgin flow promoter component, the recycled polycarbonate blend composition, and the mineral filler component.

34. The method of claim 33, wherein the mineral filler component comprises talc.

35. The method of claim 33, further comprising the step of forming a molded part from the formed polycarbonate blend composition, and wherein the molded part exhibits less splay than that of a polycarbonate blend reference composition, comprising the same amount of a reference polycarbonate component, consisting essentially of the virgin polycarbonate component in the absence of the recycled polycarbonate, the same amount of a reference impact modifier component, consisting essentially of the virgin impact modifier in the absence of the recycled impact modifier; the same amount of a reference flow promoter component, consisting essentially of the virgin flow promoter in the absence of the recycled flow promoter; and the same amount of the same mineral filler component.

36. The method of claim 24, further comprising the step of forming a molded part from the formed polycarbonate blend composition, and wherein the molded part exhibits less splay than that of a polycarbonate blend reference composition, comprising the same amount of a reference polycarbonate component, consisting essentially of the virgin polycarbonate component in the absence of the recycled polycarbonate, the same amount of a reference impact modifier component, consisting essentially of the virgin impact modifier in the absence of the recycled impact modifier; and the same amount of a reference flow promoter component, consisting essentially of the virgin flow promoter in the absence of the recycled flow promoter.

37. The method of claim 36, wherein forming a molded part comprises injection molding.

38. The method of claim 36, wherein forming a molded part comprises extrusion molding or profile extrusion process.

39. The method of claim 36, wherein the molded part exhibits at least 25% less splay than that of the polycarbonate blend reference composition.

40. A polycarbonate blend composition, comprising:
    a. a polycarbonate blend comprising:
        i) a first polycarbonate component, wherein the first polycarbonate component comprises a virgin polycarbonate and mineral filler; and
        ii) a second polycarbonate component, wherein the second polycarbonate component comprises a recycled polycarbonate, and wherein the recycled polycarbonate is essentially the same as the virgin polycarbonate prior to recycling;
    b. an impact modifier blend comprising:
        i) a first impact modifier component, wherein the first impact modifier component comprises a virgin impact modifier; and
        ii) a second impact modifier component, wherein the second impact modifier component comprises a recycled impact modifier, and wherein the recycled impact modifier is essentially the same as the virgin impact modifier prior to recycling; and
    c. a flow promoter blend comprising:
        i) a first flow promoter component, wherein the flow promoter component comprises a virgin flow promoter; and
        ii) a second flow promoter component, wherein the second flow promoter component comprises a recycled flow promoter, and wherein the recycled flow promoter is essentially the same as the virgin flow promoter prior to recycling;

wherein the recycled polycarbonate is present in an amount of up to 30 wt. % of the polycarbonate blend composition; and wherein a molded part formed from the composition, exhibits less splay than that of a polycarbonate blend reference composition, comprising the same amount of a reference polycarbonate component, consisting essentially of the virgin polycarbonate component in the absence of the recycled polycarbonate, the same amount of a reference impact modifier component, consisting essentially of the virgin impact modifier in the absence of the recycled impact modifier; and the same amount of a reference flow promoter component, consisting essentially of the virgin flow promoter in the absence of the recycled flow promoter.

41. A polycarbonate blend composition, comprising:
a. a polycarbonate blend comprising:
  i) a first polycarbonate component, wherein the first polycarbonate component comprises a virgin polycarbonate; and
  ii) a second polycarbonate component, wherein the second polycarbonate component comprises a recycled polycarbonate, and wherein the recycled polycarbonate is essentially the same as the virgin polycarbonate prior to recycling;
b. an impact modifier blend comprising:
  i) a first impact modifier component, wherein the first impact modifier component comprises a virgin impact modifier; and
  ii) a second impact modifier component, wherein the second impact modifier component comprises a recycled impact modifier, and wherein the recycled impact modifier is essentially the same as the virgin impact modifier prior to recycling;
c. a flow promoter blend comprising:
  i) a first flow promoter component, wherein the flow promoter component comprises a virgin flow promoter; and
  ii) a second flow promoter component, wherein the second flow promoter component comprises a recycled flow promoter, and wherein the recycled flow promoter is essentially the same as the virgin flow promoter prior to recycling; and
d. a mineral filler component;

wherein a molded part formed from the composition, exhibits less splay than that of a polycarbonate blend reference composition, comprising the same amount of a reference polycarbonate component, consisting essentially of the virgin polycarbonate component in the absence of the recycled polycarbonate, the same amount of a reference impact modifier component, consisting essentially of the virgin impact modifier in the absence of the recycled impact modifier; the same amount of a reference flow promoter component, consisting essentially of the virgin flow promoter in the absence of the recycled flow promoter; and the same amount of the same mineral filler component.

42. A polycarbonate blend composition, comprising:
a. a polycarbonate blend comprising:
  i) a first polycarbonate component, wherein the first polycarbonate component comprises a virgin polycarbonate, mineral filler; and
  ii) a second polycarbonate component, wherein the second polycarbonate component comprises a recycled polycarbonate, and wherein the recycled polycarbonate is essentially the same as the virgin polycarbonate prior to recycling;
b. an impact modifier blend comprising:
  i) a first impact modifier component, wherein the first impact modifier component comprises a virgin impact modifier; and
  ii) a second impact modifier component, wherein the second impact modifier component comprises a recycled impact modifier, and wherein the recycled impact modifier is essentially the same as the virgin impact modifier prior to recycling;
c. a flow promoter blend comprising:
  i) a first flow promoter component, wherein the flow promoter component comprises a virgin flow promoter; and
  ii) a second flow promoter component, wherein the second flow promoter component comprises a recycled flow promoter, and wherein the recycled flow promoter is essentially the same as the virgin flow promoter prior to recycling; and
d. a mineral filler component in an amount greater than 10% by weight of the composition;

wherein the recycled polycarbonate is present in an amount of up to 30 wt. % of the polycarbonate blend composition; and wherein the composition exhibits a melt volume rate (MVR) no more than about 20% different than that of the polycarbonate blend reference composition, as measured using ASTM D 1238 at 260° C. under 5 kg load and a 360 second dwell time;

wherein the composition exhibits a notched Izod impact strength no more than about 20% less than that of the polycarbonate blend reference composition, as measured at 23° C. according to ISO 180; and wherein a molded part formed from the composition, exhibits at least about 25% less splay than that of a polycarbonate blend reference composition, comprising the same amount of a reference polycarbonate component, consisting essentially of the virgin polycarbonate component in the absence of the recycled polycarbonate, the same amount of a reference impact modifier component, consisting essentially of the virgin impact modifier in the absence of the recycled impact modifier; the same amount of a reference flow promoter component, consisting essentially of the virgin flow promoter in the absence of the recycled flow promoter; and the same amount of the same mineral filler component.

43. A polycarbonate blend composition, comprising:
a. a virgin polycarbonate component;
b. a virgin impact modifier component;
c. a virgin flow promoter component;
d. a recycled polycarbonate blend composition comprising:
  i) a recycled polycarbonate component;
  ii) a recycled impact modifier component; and
  iii) a recycled flow promoter component;

wherein the composition does not include a fire retardant and a molded part formed from the composition exhibits less splay than that of a polycarbonate blend reference composition, wherein the polycarbonate blend reference composition comprises:
a) a reference polycarbonate component consisting essentially of same amount the virgin polycarbonate component and a recycled reference polycarbonate component in an amount essentially the same as the recycled polycarbonate component, wherein the recycled reference polycarbonate component is a virgin polycarbonate essentially the same as the polycarbonate present in the recycled polycarbonate blend composition prior to recycling;

b) a reference impact modifier component consisting essentially of same amount the virgin impact modifier component and a recycled reference impact modifier component in an amount essentially the same as the recycled impact modifier component, wherein the recycled reference impact modifier component is a virgin impact modifier essentially the same as the impact modifier present in the recycled polycarbonate blend composition prior to recycling; and c) a reference flow promoter component consisting essentially of same amount the virgin flow promoter component and a recycled reference flow promoter component in an amount essentially the same as the recycled flow promoter component, wherein the recycled reference flow promoter component is a virgin flow promoter essentially the same as the flow promoter present in the recycled polycarbonate blend composition prior to recycling.

44. The polycarbonate blend composition of claim 43, further comprising a mineral filler component.

45. The polycarbonate blend composition of claim 44, wherein the mineral filler component comprises talc.

46. The polycarbonate blend composition of claim 44, wherein the mineral filler component is present in an amount from about 5 wt % to about 25 wt %.

47. The polycarbonate blend composition of claim 44, wherein the mineral filler component is present in the amount of about 15 wt % of the polymer blend composition.

48. The polycarbonate blend composition of claim 43, wherein the virgin polycarbonate component is present in an amount from about 60 wt % to about 75 wt %.

49. The polycarbonate blend composition of claim 43, wherein the virgin polycarbonate component comprises a homopolymer polycarbonate of bisphenol A.

50. The polycarbonate blend composition of claim 43, wherein the virgin polycarbonate component comprises a blend of at least two virgin polycarbonates.

51. The polycarbonate blend composition of claim 43, wherein the virgin polycarbonate component has a weight average molecular weight of from about 20,000 g/mol to about 100,000 g/mol on an absolute PC molecular weight scale.

52. The polycarbonate blend composition of claim 43, wherein the virgin polycarbonate component has a weight average molecular weight of from about 22,000 g/mol to about 50,000 g/mol on an absolute PC molecular weight scale.

53. The polycarbonate blend composition of claim 43, wherein the recycled polycarbonate component is present in an amount from about 15 wt % to about 40 wt %.

54. The polycarbonate blend composition of claim 43, wherein the recycled polycarbonate component is essentially the same as the virgin polycarbonate prior to recycling.

55. The polycarbonate blend composition of claim 43, wherein the recycled polycarbonate component comprises a homopolymer polycarbonate of bisphenol A.

56. The polycarbonate blend composition of claim 43, wherein the recycled polycarbonate component comprises a blend of at least two recycled polycarbonates.

57. The polycarbonate blend composition of claim 43, wherein the recycled polycarbonate component has a weight average molecular weight of from about 20,000 g/mol to about 100,000 g/mol on an absolute PC molecular weight scale.

58. The polycarbonate blend composition of claim 43, wherein the recycled polycarbonate component has a weight average molecular weight of from about 22,000 g/mol to about 50,000 g/mol on an absolute PC molecular weight scale.

59. The polycarbonate blend composition of claim 43, wherein the virgin impact modifier component is present in an amount from about 0.1 wt % to about 5 wt %.

60. The polycarbonate blend composition of claim 43, wherein the virgin impact modifier comprises one more of an acrylonitrile butadiene styrene ("ABS"), a methacrylate butadiene styrene ("MBS"), and a bulk polymerized ABS ("BABS").

61. The polycarbonate blend composition of claim 43, wherein the recycled impact modifier component is present in an amount from about 0.1 wt % to about 5 wt %.

62. The polycarbonate blend composition of claim 43, wherein the recycled impact modifier component is essentially the same as the virgin impact modifier component prior to recycling.

63. The polycarbonate blend composition of claim 43, wherein the recycled impact modifier comprises one more of an acrylonitrile butadiene styrene ("ABS"), a methacrylate butadiene styrene ("MBS"), and a bulk polymerized ABS ("BABS").

64. The polycarbonate blend composition of claim 43, wherein the virgin flow promoter component is present in an amount from about 1 wt % to about 5 wt %.

65. The polycarbonate blend composition of claim 43, wherein the virgin flow promoter comprises a flow promoter selected from a styrene acrylonitrile (SAN) flow promoter and a poly(methyl methacrylate) (PMMA) flow promoter, or combinations thereof.

66. The polycarbonate blend composition of claim 43, wherein the recycled flow promoter component is present in an amount from about 1 wt % to about 5 wt %.

67. The polycarbonate blend composition of claim 43, wherein the recycled flow promoter component is essentially the same as the virgin flow promoter component prior to recycling.

68. The polycarbonate blend composition of claim 43, wherein the recycled flow promoter comprises a flow promoter selected from a styrene acrylonitrile (SAN) flow promoter and a poly(methyl methacrylate) (PMMA) flow promoter, or combinations thereof.

69. The polycarbonate blend composition of claim 43, wherein the recycled polycarbonate component comprises a recycled polycarbonate derived from post-industrial recycled (PIR) polycarbonate.

70. The polycarbonate blend composition of claim 69, wherein the recycled polycarbonate comprises less than about 1000 ppm of a bromine containing compound; and wherein the recycled polycarbonate comprises less than about 1000 ppm of a chlorine containing compound.

71. The polycarbonate blend composition of claim 69, wherein the recycled polycarbonate comprises:

a. less than about 100 pm arsenic, and wherein the arsenic can be present as elemental arsenic, one or more arsenic compounds, or a combination thereof;

b. less than about 10 ppm mercury, and wherein the mercury can be present as elemental mercury, one or more mercury compounds, or a combination thereof;

c. less than about 10 ppm lead, and wherein the lead can be present as elemental lead, one or more mercury compounds, or a combination thereof;
d. less than about 10 ppm cadmium, and wherein the cadmium can be present as elemental cadmium, one or more cadmium compounds, or a combination thereof;
e. less than about 10 ppm of a lanthanide, and wherein the lanthanide can be present in the elemental form, one or more lanthanide compounds, or a combination thereof; or
f. less than about 10 ppm of an actinide, and wherein the actinide can be present in the elemental form, one or more actinide compounds, or a combination thereof.

72. The polycarbonate blend composition of claim 43, wherein the recycled polycarbonate component comprises a recycled polycarbonate derived from post-consumer recycled (PCR) polycarbonate.

73. The polycarbonate blend composition of claim 72, wherein the recycled polycarbonate comprises less than about 1000 ppm of a bromine containing compound; and wherein the recycled polycarbonate comprises less than about 1000 ppm of a chlorine containing compound.

74. The polycarbonate blend composition of claim 72, wherein the recycled polycarbonate comprises:
  a. less than about 100 pm arsenic, and wherein the arsenic can be present as elemental arsenic, one or more arsenic compounds, or a combination thereof;
  b. less than about 10 ppm mercury, and wherein the mercury can be present as elemental mercury, one or more mercury compounds, or a combination thereof;
  c. less than about 10 ppm lead, and wherein the lead can be present as elemental lead, one or more mercury compounds, or a combination thereof;
  d. less than about 10 ppm cadmium, and wherein the cadmium can be present as elemental cadmium, one or more cadmium compounds, or a combination thereof;
  e. less than about 10 ppm of a lanthanide, and wherein the lanthanide can be present in the elemental form, one or more lanthanide compounds, or a combination thereof; or
  f. less than about 10 ppm of an actinide, and wherein the actinide can be present in the elemental form, one or more actinide compounds, or a combination thereof.

75. The polycarbonate blend composition of claim 43, wherein molded part formed from the polycarbonate blend composition exhibits at least about 25% less splay than that of a polycarbonate blend reference composition.

76. The polycarbonate blend composition of claim 43, wherein the polycarbonate blend composition further exhibits a melt volume rate (MVR) no more than about 20% different than that of the polycarbonate blend reference composition, as measured using ASTM D 1238 at 260° C. under 5 kg load and a 360 second dwell time.

77. The polycarbonate blend composition of claim 43, wherein the polycarbonate blend composition further exhibits a notched Izod impact strength no more than about 20% less than that of the polycarbonate blend reference composition, as measured at 23° C. according to ISO 180.

78. A polycarbonate blend composition, comprising:
  a. a virgin polycarbonate component;
  b. a virgin impact modifier component;
  c. a virgin flow promoter component;
  d. a mineral filler component in an amount greater than 10% by weight of the composition; and
  e. a recycled polycarbonate blend composition comprising:
    i) a recycled polycarbonate component;
    ii) a recycled impact modifier component; and
    iii) a recycled flow promoter component;
  wherein the recycled polycarbonate is present in an amount of up to 30 wt. % of the polycarbonate blend composition; and
  wherein a molded part formed from the composition exhibits at least about 25% less splay than that of a polycarbonate blend reference composition, wherein the polycarbonate blend reference composition comprises:
  a) a reference polycarbonate component consisting essentially of same amount the virgin polycarbonate component and a recycled reference polycarbonate component in an amount essentially the same as the recycled polycarbonate component, wherein the recycled reference polycarbonate component is a virgin polycarbonate essentially the same as the polycarbonate present in the recycled polycarbonate blend composition prior to recycling;
  b) a reference impact modifier component consisting essentially of same amount the virgin impact modifier component and a recycled reference impact modifier component in an amount essentially the same as the recycled impact modifier component, wherein the recycled reference impact modifier component is a virgin impact modifier essentially the same as the impact modifier present in the recycled polycarbonate blend composition prior to recycling;
  c) a reference flow promoter component consisting essentially of same amount the virgin flow promoter component and a recycled reference flow promoter component in an amount essentially the same as the recycled flow promoter component, wherein the recycled reference flow promoter component is a virgin flow promoter essentially the same as the flow promoter present in the recycled polycarbonate blend composition prior to recycling; and
  d) essentially the same amount of the mineral filler component.

* * * * *